United States Patent [19]
Tokura et al.

[11] Patent Number: 5,253,007
[45] Date of Patent: Oct. 12, 1993

[54] CAMERA HAVING SPECIAL PHOTOGRAPHY FUNCTION

[75] Inventors: Go Tokura; Akira Karasawa; Shoji Kaihara; Etsuro Furutsu; Nobuyuki Inoue, all of Kanagawa, Japan

[73] Assignee: Canon Kabushiki Kaisha, Tokyo, Japan

[21] Appl. No.: 935,831

[22] Filed: Aug. 26, 1992

[30] Foreign Application Priority Data

| Aug. 30, 1991 | [JP] | Japan | 3-220059 |
| Nov. 22, 1991 | [JP] | Japan | 3-332867 |
| Dec. 26, 1991 | [JP] | Japan | 3-356784 |
| Dec. 26, 1991 | [JP] | Japan | 3-356785 |
| Dec. 26, 1991 | [JP] | Japan | 3-356786 |
| Dec. 26, 1991 | [JP] | Japan | 3-356787 |

[51] Int. Cl.$^5$ .............. G03B 13/36; G03B 17/00; G03B 17/24; G03B 15/03
[52] U.S. Cl. ................. 354/400; 354/446; 354/413; 354/106; 354/209
[58] Field of Search ........... 354/400, 402, 442, 413, 354/412, 105, 106, 446

[56] References Cited

U.S. PATENT DOCUMENTS

| 3,842,587 | 10/1974 | Strauss et al. | 354/209 X |
| 4,676,624 | 6/1987 | Kiuchi et al. | 354/209 X |
| 4,723,141 | 2/1988 | Hamada et al. | 354/209 X |
| 4,937,609 | 6/1990 | Wakabayashi et al. | 354/400 |
| 5,086,310 | 2/1992 | Iwashita et al. | 354/106 X |
| 5,122,826 | 6/1992 | Kodaka | 354/402 |

Primary Examiner—W. B. Perkey
Attorney, Agent, or Firm—Robin, Blecker, Daley & Driscoll

[57] ABSTRACT

A camera having a special photography function comprises a focus detecting circuit for detecting a state of focus of a subject, a focus-position altering circuit for altering a focus position of a photographic optical system in response to a detection result provided by the focus detecting circuit, and a special-photography executing circuit for executing special photography utilizing multiple exposure. The special-photography executing circuit is arranged to control the focus-position altering circuit in response to a release operation to shoot one exposure on a photosensitive portion with the photographic optical system placed in an in-focus position and continuously shoot at least one exposure on the same photosensitive portion with the photographic optical system placed in a defocused position on a closest-distance side, thereby effecting the multiple exposure.

6 Claims, 22 Drawing Sheets

CAMERA HAVING SPECIAL PHOTOGRAPHY FUNCTION

BACKGROUND OF THE INVENTION

1. Field of the Invention

The present invention relates to an improvement in a camera having a special photography function provided with at least two photographic modes: a normal photography mode and a special photography mode (soft-focus photography mode).

2. Description of the Related Art

In general photography, it is common practice to execute exposure on the basis of an appropriate exposure control value when the focus position of a photographic optical system coincides with an in-focus position. However, to diversify photographic representation, a variety of proposals have been made as to a technique for creating a special photography effect. Soft-focus photography is known as a typical technique for creating a special photography effect which is remarkably effective in taking a portrait photograph, a still-life photograph or the like.

The soft-focus photography is classified into two major categories. One category is to utilize a filter designed for soft-focus photography, and the other category is to utilize a lens designed for soft-focus photography. The filter designed for soft-focus photography, which is utilized in the former category, is a skylight filter coated with fat and oil such as a petroleum jelly, a filter having fine projections or recesses over its surface, or the like, and, in practical use, such a filter is attached to the front of a photographic lens unit. The lens designed for soft-focus photography, which is utilized in the latter category, is a photographic optical system designed to use a high-order spherical aberration to generate a light flare around the periphery of a subject image, so that an illusory effect is created.

Recently, a novel lens unit based on a sophisticated design technique utilizing a computer has been disclosed in, for example, U.S. Pat. No. 4,781,446. In normal use, the lens unit serves as an optical system free from aberration similarly to a general lens unit. However, the lens unit can also serve as a soft-focus optical system capable of generating a high-order spherical aberration by causing at least one lens in the optical system to move along the optical axis.

In addition to the above-described soft-focus photography methods, a method is known in which an ordinary camera and an ordinary lens unit are used to achieve soft-focus photography. One example of the method utilizes multiple exposure photography which is the photographic technique of exposing the same frame of film to both a focused subject image and a defocused subject image.

However, any of the aforesaid soft-focus photography methods has a number of problems. For example, in the case of the method utilizing a skylight filter coated with fat and oil, such as a petroleum jelly, which is attached to the front of a photographic lens unit, a photographer must take care of maintenance of such a filter and carry it together with a camera system at any time. In addition, the photographer is forced to perform filter replacement, according to whether a soft-focus effect is needed. Accordingly, the method utilizing the skylight filter is unsuitable for a casual snapshot which is typically made outdoors. For a similar reason, the method utilizing a filter having fine projections or recesses over its surface, which is attached to the front of a photographic lens unit, is also inconvenient if normal photography and soft-focus photography are to be selectively performed for each individual scene.

In respect of the above-described points, it seems that the lens unit which is switchable between a normal photography setting and a soft-focus photography setting soft is far more convenient than any of the aforesaid filters. This is because such lens unit eliminates the necessity of carrying a special tool or of performing a complication replacement operation and permits normal photography and soft-focus photography t be instantaneously switched. However, the use of the lens unit remarkably impairs a distinctive feature of a single-reflex camera, i.e., the advantage that various interchangeable lenses are usable. In addition, since a high-order spherical aberration is utilized, a soft-focus effect appears only when a diaphragm is set to a position equivalent to or near to an fully open aperture. As a result, it is impossible to achieve a satisfactory soft-focus effect in a place, such as the outdoors, where a subject luminance is so high that it is necessary to stop down the diaphragm to a substantial extent.

A method capable of overcoming the above-described various disadvantages is the soft-focus photography utilizing the aforementioned multiple exposure photography. However, the soft-focus photography utilizing the multiple exposure photography has the following problems.

A first problem resides in the complexity of a camera operation. More specifically, the photographer first sets a multiple exposure photography mode, and then determines exposure values for use in individual cycles of exposure to be executed in multiple exposure photography, on the basis of a measured-light value, so that a desired multiple exposure effect can be obtained, and must apply an exposure compensation to each exposure cycle on the basis of the determined exposure values. In addition, to create an optimum soft-focus effect, the photographer must take account of numerous items such as the amount of defocus by which a photographic lens is to be defocused for defocused photography, the distribution of the amount of exposure for in-focus photography and the amount of exposure for the defocused photography, and the number of cycles of exposure for the defocused photography.

If the amount of defocus in each cycle of exposure for defocused photography is extremely small, no substantial soft-focus effect can be obtained. If such an amount is extremely large, the contour line of a defocused image substantially disappears and a soft-focus effect does not appear. If a subject different from a main subject is present in a focus position reached by the photographic lens which is driven for the purpose of defocused photography, the different subject is focused and a picture partially devoid of a soft-focus effect is photographed. For this reason, the photographer must take care of the direction in which the photographic lens is to be driven for the defocused photography.

In addition, to prevent an image shake, it is necessary to extremely promptly perform an operation which follows the completion of a first cycle of exposure in the multiple exposure photography (i.e., the operation of starting a second cycle of exposure).

As described above, to successfully perform photography having a soft-focus effect by using the multiple exposure photography, the photographer must have rich experience, special knowledge or photographic knacks. The above-described camera operation is, therefore, difficult for a beginner to carry out.

SUMMARY OF THE INVENTION

It is, therefore, an object of the present invention is to provide a camera having a special photography function capable of realizing photography which can create a special effect, without forcing a user to perform a complicated operation.

To achieve the above object, in accordance with one aspect of the present invention, there is provided an improvement in which if a special photography mode is selected through mode selecting means and a shutter release operation is performed, special-photography executing means controls focus-position altering means and exposure controlling means to shoot one exposure on a photosensitive portion of film with a photographic optical system placed in an in-focus position and continuously shoot at least one exposure on the same photosensitive portion with the photographic optical system placed in a defocused position on a closest-distance side, thereby carrying out multiple exposure photography.

Another object of the present invention is to provide an improved arrangement which makes it possible to prevent a camera shake or an image shake due to a motion of a subject in a scene which is being photographed, thereby realizing photography of satisfactory soft-focus effect (not only in the nighttime but also during fill-in flash photography).

To achieve the above object, in accordance with another aspect of the present invention, there is provided an improvement which is arranged to execute flashing only during an exposure cycle in multiple exposure photography with a photographic lens placed in an in-focus position, whereby it is not necessary to insert the processing step of waiting for the passage of the time duration required to charge the main capacitor of a flash unit so that flashing can be executed in the next exposure cycle. Accordingly, it is possible to reduce the time interval between the subsequent exposure cycles in the multiple exposure photography.

Another object of the present invention is to provide an improved arrangement which makes it possible to prevent a camera shake or an image shake due to a motion of a subject in a scene which is being photographed, thereby realizing photography of satisfactory soft-focus effect.

To achieve the above object, in accordance with another aspect of the present invention, there is provided an improvement which is arranged to fix an aperture value for a first cycle of exposure in multiple exposure photography and that for the second and subsequent exposure cycles in the multiple exposure photography, whereby it is possible to easily determine an exposure value for use in the multiple exposure photography. In addition, in the improvement, since the complexity of a photographic operation for the multiple exposure photography is decreased to rapidly perform a photographic operation between each exposure cycle in the multiple exposure photography, it is possible to reduce the time interval between each exposure cycle in the multiple exposure photography.

Another object of the present invention is to provide an improved arrangement which makes it possible to reduce a processing time duration and also to enlarge the luminance range in which a subject image with a soft-focus effect can be photographed.

To achieve the above object, in accordance with another aspect of the present invention, there is provided an arrangement which operates on the basis of a program chart for exposure control in which an aperture value is set on an open-aperture-priority basis if soft-focus photography is selected, whereby it is possible to minimize the amount of lens driving required to form an defocused image in a second cycle of exposure in multiple exposure photography.

Another object of the present invention is to provide an improved arrangement which makes it possible to shorten a processing time duration by eliminating the necessity of altering an aperture value.

To achieve the above object, in accordance with another aspect of the present invention, there is provided an arrangement which operates on the basis of a program chart for exposure control in which an aperture value is fixed if soft-focus photography is selected, whereby even if the degree of the soft-focus effect is to be altered on the basis of the exposure ratio of a first cycle of exposure to a second cycle of exposure, it is possible to alter the exposure ratio by altering only a shutter speed.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 1:
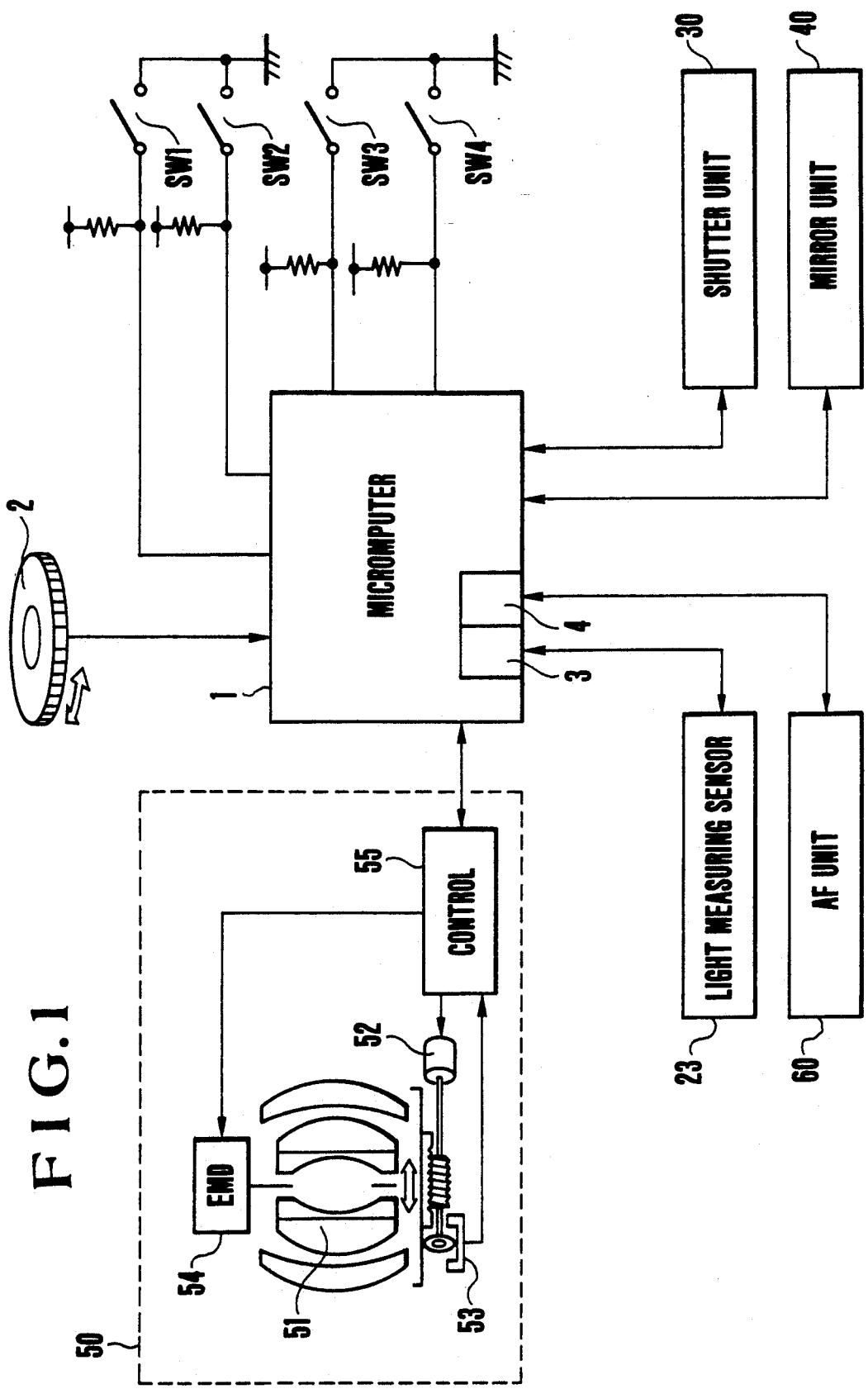
FIG. 1 is a schematic view showing the arrangement of a camera according to each of first to third embodiments of the present invention.

FIG. 1 is a block diagram schematically showing the arrangement of a camera having a special photography function according to a first embodiment of the present invention.

The arrangement shown in FIG. 1 includes a microcomputer 1 for controlling the processing operation of each part of the camera, a photographic mode dial 2 operated to input a photographic mode, an A/D converter 3 for supplying the microcomputer 1 with a signal outputted from a light measuring sensor 23 for measuring the luminance of a subject, an A/D converter 4 for supplying the microcomputer 1 with a signal outputted from a line sensor provided in an AF unit 60, an activating switch SW1 arranged to be turned on in interlocked relation to the operation of pressing down a release button (not shown) to its first stroke position, a release starting switch SW2 arranged to be turned on in interlocked relation to the operation of pressing down the release button to its second stroke position, a state-of-back-lid detecting switch SW3 for detecting whether the back lid of the camera is open, a film-loading detecting switch SW4 for detecting whether a film is loaded in a film-cartridge chamber, the aforesaid light measuring sensor 23 for measuring the luminance of a subject, a shutter unit 30, a mirror unit 40, a photographic lens unit 50, a photographic lens 51 whose focus position is adjustable, a focus adjusting motor 52, an encoder 53 for detecting the amount of driving of the focus adjusting motor 52, an electromagnetically driven diaphragm device 54 for adjusting the amount of light passing through the photographic lens unit 50, a lens unit controlling circuit 55, and the aforesaid AF unit 60 for detecting an in-focus position.

Figure 2:
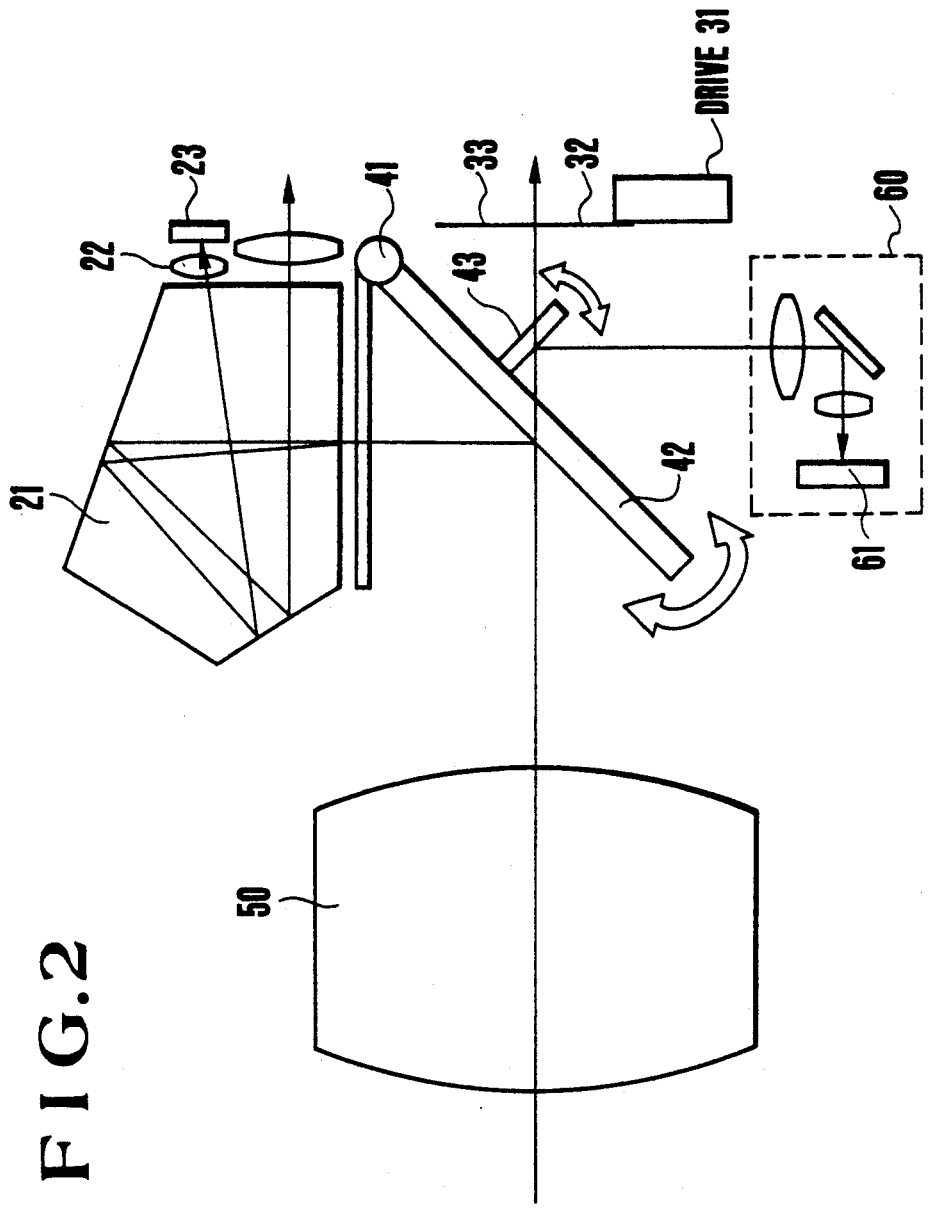
FIG. 2 is a schematic view showing a light measuring system and an AF system which are incorporated in the camera according to each of the first to third embodiments of the present invention.

FIG. 2 is a schematic view showing a light measuring system and an AF system which are incorporated in the aforesaid camera.

The arrangement shown in FIG. 2 includes a pentagonal prism 21 for a viewfinder, a light measuring optical system 22 for focusing an image onto the light measuring sensor 23, a focal plane shutter driving device 31, a leading curtain 32 of a focal plane shutter, a trailing curtain 33 of the focal plane shutter, a mirror driving shaft 41 rotated by a motor (not shown) which serves to drive a main mirror which will be described later (i.e., to move the main mirror up and down), to transport a film, and to charge a shutter, a semi-transparent main mirror 42 for dividing an optical path extending from the photographic lens unit 50 into an optical path leading to a viewfinder portion and an optical path leading to an AF portion, and a submirror 43 for conducting, to the AF unit 60, a bundle of light rays transmitted along the optical path leading to the AF portion.

An exposure sequence of the camera will be described below with reference to FIGS. 1 and 2.

When the release button is pressed down to the second stroke position, the release starting button SW2 is turned on to start a release sequence.

More specifically, the microcomputer 1 drives the motor (not shown) to cause the main mirror 42 to move up toward a viewfinder side (by means of the mirror driving shaft 41). As the main mirror 42 moves up, the submirror 43 is folded on the reverse side of the main mirror 42, so that the submirror 43 does not intercept the optical path extending between the photographic lens 51 and a film plane. When the main mirror 42 completes moving up to the viewfinder side, the microcomputer 1 instructs the focal plane shutter driving device 31 to cause the leading curtain 32 of the focal plane shutter to run. Thus, a first cycle of exposure in multiple exposure photography is started. After the passage of a shutter time based on exposure computations, the microcomputer 1 instructs the focal plane shutter driving device 31 to cause the trailing curtain 33 of the focal plane shutter to run. Thus, the first cycle of exposure in the multiple exposure photography of the film is ended.

Then, the microcomputer 1 drives the motor to cause the main mirror 42 to move down from the viewfinder side. As the main mirror 42 moves down, the submirror 43 folded on the reverse side of the main mirror 42 is restored to the original position. Simultaneously with the downward movement of the main mirror 42, a shutter driving spring (not shown) is charged. Then, the photographic lens 51 is driven to shift its focus position in a defocusing direction by a predetermined amount in preparation for a second cycle of exposure in the multiple exposure photography. Then, the microcomputer 1 drives the motor to cause the main mirror 42 to move up to the viewfinder side. At this point in time, if it is necessary to shorten the processing time required to execute the above-described operations, the driving of the photographic lens 51 and the driving of the main mirror 42 may be executed at the same time. When the driving of the photographic lens 51 and the upward movement of the main mirror 42 are ended, the microcomputer 1 instructs the focal plane shutter driving device 31 to cause the leading curtain 32 of the focal plane shutter to run, as in the case of the first cycle of exposure. Thus, the second cycle of exposure in the multiple exposure photography is started. After the passage of a specified time, the microcomputer 1 instructs the focal plane shutter driving device 31 to cause the trailing curtain 33 of the focal plane shutter to run. Thus, the second cycle of exposure of the film is ended. Then, the microcomputer 1 drives the motor to cause the main mirror 42 to move down from the viewfinder side. As the main mirror 42 moves down, the submirror 43 folded on the reverse side of the main mirror 42 is restored to the original position. Simultaneously with the downward movement of the main mirror 42, the shutter driving spring is charged.

In the above-described manner, the first and second cycles of exposure in the multiple exposure photography of the same frame of the film are completed and the film is then transported by one frame in preparation for exposure of the next frame.

Figure 3A:
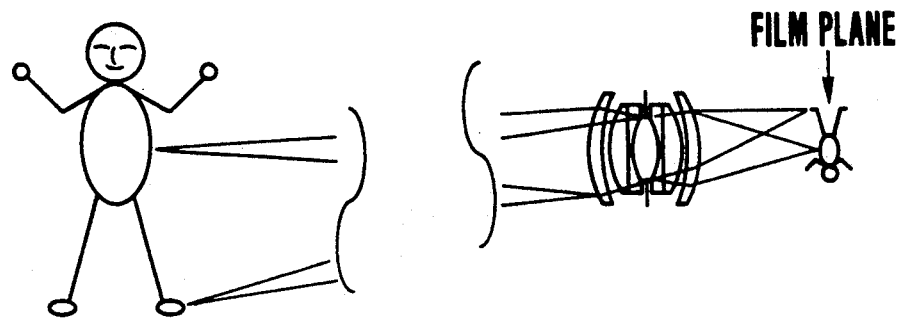
FIGS. 3(a), 3(b) and 3(c) are schematic views aiding in explaining an operation executed during soft-focus photography in each of the embodiments of the present invention.
Figure 3B:
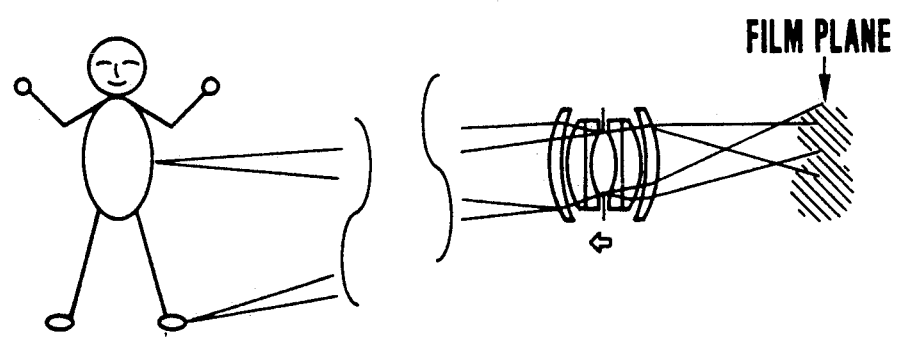
Figure 3C:
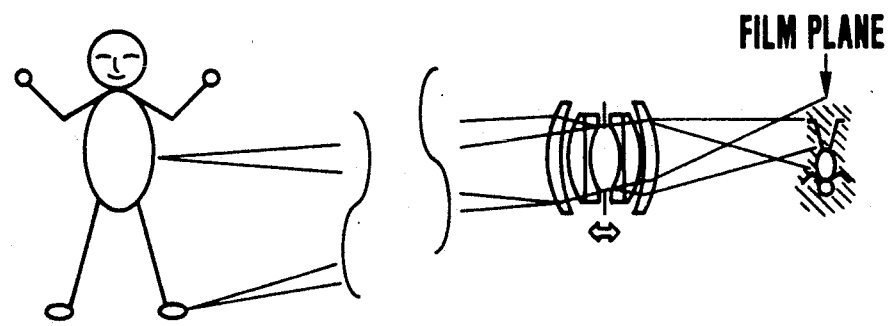

FIGS. 3(a), 3(b) and 3(c) are schematic views aiding in explaining an operation executed during the above-described soft-focus photography.

FIG. 3(a) is a view showing the state in which film is exposed to an image of a subject which is in focus, that is, the state of the first cycle of exposure in the multiple exposure photography. In this state, a focused subject image is projected onto the film plane of the film.

FIG. 3(b) is a view showing the state in which the film is exposed to an image of the subject which is out of focus, that is, the state of the second cycle of exposure in the multiple exposure photography. In this state, a defocused subject image is projected onto the film plane of the film.

FIG. 3(c) is a view aiding in explaining a subject image finally formed on the film by exposure. As shown, the focused subject image obtained by the first cycle of exposure in the multiple exposure photography and the defocused subject image obtained by the second cycle of exposure are combined to realize a soft-focus effect.

Figure 4:
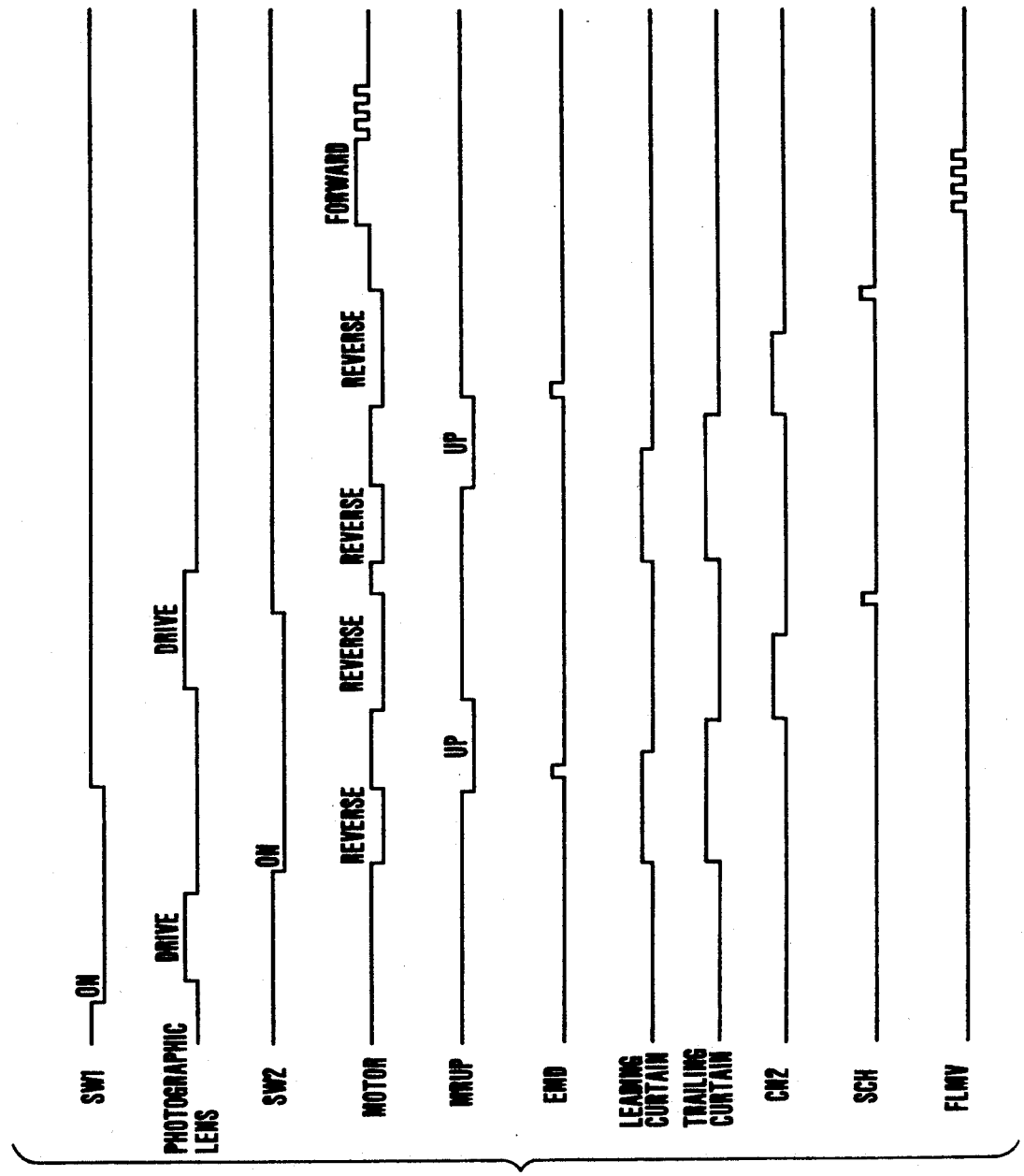
FIG. 4 is a timing chart showing the operation executed during the soft-focus photography in each of the embodiments of the present invention.

FIG. 4 is a timing chart showing the operation executed during the above-described soft-focus photography.

The following description is given with illustrative reference to a camera which is arranged to cause the main mirror 42 to move up, charge the shutter and cause the main mirror 42 to move down by means of the reverse driving of the motor, as well as to execute film transportation by means of the forward driving of the motor. It is also assumed that the diaphragm device of the camera is an electromagnetically driven diaphragm device arranged to stop down a diaphragm by the energization of a stepping motor and, subsequently, hold the state of the diaphragm during the de-energization of the stepping motor. When the stepping motor is again energized, the diaphragm is fully opened. It is also assumed that the camera is provided with a shutter mechanism in which the leading and trailing curtains of the focal plane shutter are mechanically held when the camera is in its standby state, and in which before the mechanical holding is cancelled, electromagnets are energized and the leading and trailing curtains are held by the attraction forces of the respective energized electromagnets. The leading and trailing curtains are de-energized in synchronism with their respective running start timings.

The operation of the above-described soft-focus photography will be described below with reference to the timing chart of FIG. 4.

When the activating switch SW1 is turned on in interlocked relation to the operation of pressing down the release button, light measuring and distance measuring operations are initiated and, then, driving of the photographic lens 51 toward a position based on the result of distance measurement computations is initiated. After an in-focus position has been reached, when the release starting switch SW2 to start an exposure sequence is turned on, the reverse driving of the motor is initiated and the main mirror 42 starts to move upward. The respective electromagnets of the leading and trailing curtains of the shutter are energized, and after the armatures of the respective electromagnets have been attracted and held in position, the mechanical holding of each of the leading and trailing curtains 32 and 33 is cancelled. When the main mirror 42 completes moving up, a signal MRUP indicative of a mirror-up state is turned on ("low") and a diaphragm signal EMD goes to its high-level, whereby the aforesaid electromagnetically driven diaphragm device is actuated.

Then, the energization of the electromagnet for the shutter leading curtain 32 is stopped to allow the leading curtain 32 to run. After the passage of a shutter time based on exposure computations, the energization of the electromagnet for the shutter trailing curtain 33 is stopped to allow the trailing curtain 33 to run. Thereafter, when a signal CN2 indicative of the completion of the running of the trailing curtain 33 goes to its high level, the motor is again reversed to cause the main mirror 42 to start moving downward, and the signal MRUP is turned off ("high"). Simultaneously, shutter charging is executed, whereafter the signal CN2 indicative of the completion of the running of the trailing curtain 33 goes to its low level. The reverse driving of the motor is continued until a shutter charging completion signal SCH is generated ("high").

During the aforesaid shutter charging, the photographic lens 51 is driven to move by a predetermined amount for the purpose of a defocused exposure which constitutes the second cycle of exposure in the multiple exposure photography. If the driving of the photographic lens 51 by the predetermined amount is completed, the reverse driving of the motor is immediately executed and an exposure sequence for the second cycle of exposure in the multiple exposure photography is started.

At this point in time, whether the generation of the shutter charging completion signal SCH or the completion of the driving of the photographic lens 51 takes place earlier depends on the amount or speed of lens driving. In the timing chart referred to herein, the completion of the driving of the photographic lens 51 is later than the generation of the shutter charging completion signal SCH. Accordingly, after the completion of the driving of the photographic lens 51, the exposure sequence of the second cycle of exposure is started.

When the exposure sequence of the second cycle of exposure is started, the reverse driving of the motor is executed to cause the main mirror 42 to start moving up. When the main mirror 42 completes moving up, the signal MRUP indicative of a mirror-up state is turned on. Then, the leading curtain 32 of the focal plane shutter runs, and after the passage of a shutter time based on exposure computations, the trailing curtain 33 runs. When the signal CN2 indicative of the completion of the running of the trailing curtain 33 goes to the high level, the motor is again reversed to cause the main mirror 42 to move down, and the signal MRUP is turned off. At this point in time, the electromagnetically driven diaphragm device, which has been stopped down since the first cycle of exposure in the multiple exposure photography was executed, is again energized to fully open the diaphragm. At the same time that the main mirror 42 completes moving down, shutter charging is executed, whereafter the signal CN2 indicative of the completion of the running of the trailing curtain 33 goes to the high level. The reverse driving of the motor is continued until the shutter charging completion signal SCH is generated, similarly to the above-described case.

When the above-described release sequence of the soft-focus photography is completed, the motor is driven in the forward direction to transport the film by one frame.

In FIG. 4, a signal FLMV is a pulse signal which is generated when the film is being transported. When a predetermined number of pulse signals FLMV are counted, the energization of the motor is placed under duty control so that the motor is braked and stopped in preparation for the next photography.

The amount of lens driving for the purpose of the defocused exposure which constitutes the second cycle of exposure in the multiple exposure photography will be described below.

An equation used to calculate the amount of lens driving is as follows:

$$P = \{(n \times F \times \sigma)/s\}/d$$

where "P" represents the amount of lens driving (the number of lens driving pulses), "F" represents an aperture value, "$\sigma$" represents a minimum circle of confusion, "s" represents the operational sensitivity of the lens, "d" represents a lens movement pitch, and "n" represents the required defocus magnification. The amount of defocus in the second cycle of exposure in the multiple exposure photography is determined by the value of "n", whereby the degree of the soft-focus effect can be varied. In the aforesaid embodiment, the value of "n" is selected to be 50, as will be described later.

Regarding the direction of lens driving for the purpose of the defocused photography which constitutes the second cycle of exposure in the multiple exposure photography, the photographic lens 51 is initially driven toward its closest-distance end. This is because the probability that another subject may exist on a closest-distance side with respect to the main subject is high. However, if the photographic lens 51 is driven but the predetermined amount of lens driving calculated from the aforesaid equation is not satisfied, after the photographic lens 51 has reached the closest-distance end, it is driven to move by the predetermined amount of lens driving toward its infinity end. At this point in time, the predetermined amount of lens driving calculated from the aforesaid equation is compared with the maximum amount of defocus of the photographic lens of an individual lens unit actually attached to the camera, and as the case may be, even if the predetermined amount of lend driving is not satisfied although the photographic lens has been driven, the photographic lens may be stopped at the closest-distance end.

The distribution of the amount of exposure in in-focus photography and the amount of exposure in defocused photography will be described below. The in-focus photography constitutes the first cycle of exposure in the multiple exposure photography and the defocused photography constitutes the second cycle of exposure in the multiple exposure photography.

In general, in normal multiple exposure photography, since the amount of exposure in each of the first and second cycles of exposure is uniform, the ratio of exposures in both exposure cycles is 1:1. However, the ratio of exposures is not limited to 1:1, and various other exposure ratios may be utilized to achieve a variety of special effects. In this embodiment, by selecting a desired ratio of exposures from various ratios, it is possible to change the degree of the soft-focus effect, whereby various special effects can be realized. If the amount of exposure in the second cycle of exposure in the multiple exposure photography is made larger than the amount of exposure in the first cycle of exposure in the multiple exposure photography, an in-focus image becomes thinner and the degree of the soft-focus effect becomes larger. Accordingly, it is necessary to select a correct exposure ratio according to each individual photographic scene to prevent occurrence of a photograph which is merely out of focus. However, since processing for selecting the correct exposure ratio is not directly related to the present invention, no further reference is made.

If the above-described photographic elements are variously combined, it is possible to arbitrarily set the degree of the soft-focus effect with the camera set to the soft-focus photography mode according to the above-described embodiment.

Figure 5:
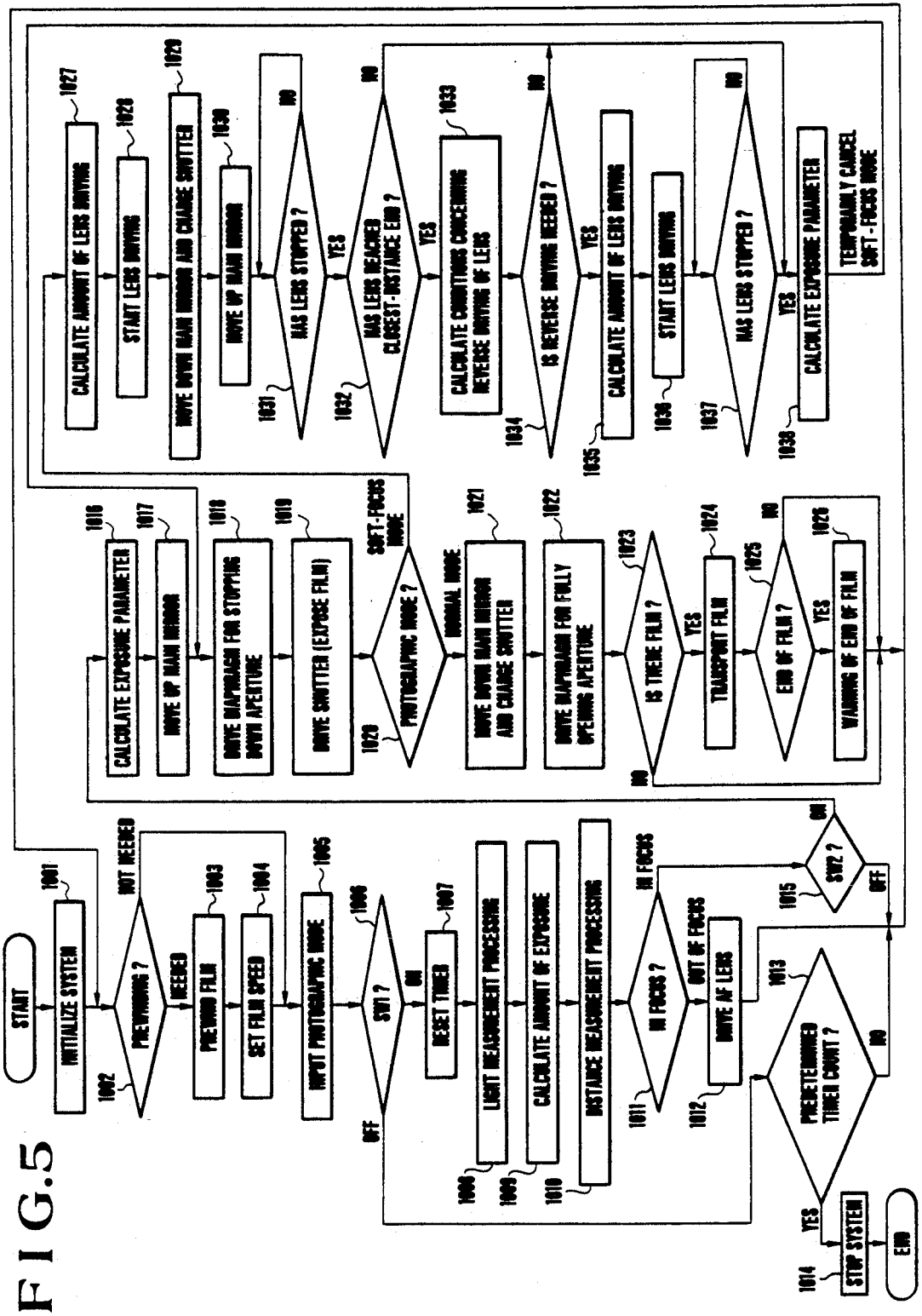
FIG. 5 is a flowchart showing the operation of a microcomputer used in the first embodiment of the present invention.

FIG. 5 is a flowchart showing the operation of the microcomputer 1 of the camera according to the embodiment shown in FIG. 1. The operation of the microcomputer 1 will be described below with reference to this flowchart.

Step 1001: An I/O device (a peripheral IC of the microcomputer 1) is reset and a memory is initialized. In this step, an operation continuation timer (not shown) is also reset.

Step 1002: From the state of the state-of-back-lid detecting switch SW3 or the state of the film-loading detecting switch SW4, it is determined whether the back lid of the camera is closed and a film is loaded. If it is determined that the back lid is closed and a film is loaded, it is determined whether prewinding has been executed. If it is determined that no prewinding has yet been executed, the process proceeds to Step 1003; otherwise, the process proceeds to Step 1005.

Step 1003: The film is wound around a film take-up spool (not shown) until the stretched state of the film is detected. In other words, the entire film is wound around the film take-up spool. During the prewinding, the number of signals from a film moving means is counted to detect and memorize the number of unexposed frames of the film (the prescribed number of frames). Regarding the detection of the stretched state of the film, if no signal from a film movement detecting means (not shown) for detecting a movement of the perforation of the film is generated during a certain predetermined time, it is determined that the film has been stretched.

Step 1004: Film speed information is read by a DX code reading means and the read film speed information is memorized. If a film with no DX code is loaded, a photographer inputs the film speed and the input film speed is memorized.

Step 1005: A photographic mode selected by the photographic mode dial 2 is read out and the selected photographic mode is memorized.

Step 1006: The release button is pressed down to the first stroke position, and it is determined whether the activating switch SW1 has been turned on. If it is determined that the activating switch SW1 has been turned on, the process proceeds to Step 1007. If it is determined that the activating switch SW1 remains off, the process proceeds to Step 1013.

Step 1007: The operation continuation timer is reset to extend an operating time.

Step 1008: A portion of an image focused in the viewfinder by the photographic lens 51 is transmitted through the pentagonal prism 21 and is then conducted to the light measuring sensor 23 through the light measuring optical system 22. In this step, the microcomputer 1 receives the output of the light measuring sensor 23 and performs A/D conversion thereof. The microcomputer 1 memorizes the digital value as a measured-light value.

Step 1009: A shutter speed and an aperture value are calculated on the basis of the measured-light value memorized in Step 1008, the film speed information memorized in Step 1004 and the photographic mode memorized in Step 1005. The calculated shutter speed and aperture value are memorized.

Step 1010: The image passed through the photographic lens 51 is transmitted through the main mirror 42 and conducted to the AF unit 60 by the submirror 43. In the AF unit 60, the conducted image is divided into a pair of images by a pupil dividing means and the pair of images are converted into an electrical signal by the line sensor 61. The microcomputer 1 receives a signal outputted from the line sensor 61 and performs A/D conversion of the signal, and memorizes the digital signal as an AF signal. Then, the microcomputer 1 performs correlative computations of the AF signal to calculate the amount of defocus.

Step 1011: It is determined whether an in-focus state has been reached, from the amount of defocus calculated in Step 1010. If the in-focus state has been reached, the process proceeds to Step 1015; otherwise, the process proceeds to Step 1012.

Step 1012: The amount of lens driving is calculated from the amount of defocus calculated in Step 1010, and the lens unit controlling circuit 55 in the photographic lens unit 50 is made to perform a focus adjustment operation according to the amount of lens driving. The lens unit controlling circuit 55 drives the focus adjusting motor 52 in accordance with the supplied amount of lens driving, and performs positioning control of the photographic lens 51 on the basis of an output signal from an encoder 53. The process returns to Step 1002.

If it is determined in Step 1006 that the activating switch SW1 is off, the process proceeds to Step 1013 as described above.

Step 1013: A decision is made as to the state of the operation continuation timer. If the operation continuation timer has reached a predetermined count, the process proceeds to Step 1014. If the operation continuation timer has not reached the predetermined count, the process returns to Step 1002.

Step 1014: The operation of the camera is stopped by stopping a DC/DC converter (not shown) or the like or by stopping the energization of each actuator.

If it is determined in Step 1011 that the in-focus state has been reached, the process proceeds to Step 1015 as described above.

Step 1015: It is determined whether the release starting switch SW2 has been turned on. If it is determined that the release starting switch SW2 has been turned on, the process proceeds to Step 1016, in which a release sequence is started. If it is determined that the release starting switch SW2 is off, the process returns to Step 1002.

Step 1016: The running start timing of each of the leading and trailing curtains 32 and 33 of the focal plane shutter is set on the basis of the shutter speed and the aperture value memorized in Step 1009. Similarly, the amount of driving of the electromagnetically driven diaphragm device 54 in the photographic lens unit 50 is set.

Step 1017: The motor (not shown) is driven to rotate the mirror driving shaft 41, thereby causing the main mirror 42 to move up toward the viewfinder side. During this time, the submirror 43 moves up with the upward movement of the main mirror 42, and is finally folded on the reverse side of the main mirror 42.

Step 1018: The electromagnetically driven diaphragm device 54 which is in a fully open state to allow the photographer to observe a subject image in the viewfinder is driven by the amount of diaphragm driving set in Step 1016. Thus, the diaphragm is set to a predetermined stopped down state for photography.

Step 1019: Control of shutter driving is performed on the basis of the running start timing of each of the leading and trailing curtains 32 and 33 of the focal plane shutter, which timing has been set on the basis of the shutter speed and the aperture value memorized in Step 1009. Thus, the film is exposed to the subject image.

Step 1020: A decision is made as to the photographic mode memorized in Step 1005. In the case of the soft-focus mode, the process proceeds to Step 1027, while in the case of the normal photography mode, the process proceeds to Step 1021.

Step 1021: The motor (not shown) is reversed to rotate the mirror driving shaft 41 in a direction opposite to the aforesaid direction, thereby causing the main mirror 42 to move down to the original position. During this time, the submirror 43 folded on the reverse side of the main mirror 42 returns to the original position with the downward movement of the main mirror 42. Shutter charging is also performed in interlocked relation to the downward movement of the main mirror 42.

Step 1022: The electromagnetically driven diaphragm device 54 which has been stopped down in Step 1018 is driven so that it is fully opened.

Step 1023: If it is determined that the film is loaded, the process proceeds to Step 1024; while if it is determined that no film is loaded, the process returns to Step 1002.

Step 1024: A film transporting device is driven until the number of pulse signals outputted from the film movement detecting means (not shown) for detecting a movement of the perforation of the film reaches a value indicative of one frame, whereby the film is wound by one frame.

Step 1025: The prescribed number of frames of the film memorized in Step 1003 is compared with the current number of exposed frames, and it is determined whether the end of the film has been reached. If it is determined that the end of the film has not yet been reached, the process returns to Step 1002. If it is determined that the end of the film has been reached, the process proceeds to Step 1026.

Step 1026: A warning of the end of the film is given to the photographer, and any operation other than film replacement is inhibited. The process returns to Step 1002.

If it is determined in Step 1020 that the soft-focus mode is selected, the process proceeds to Step 1027, as described previously.

Step 1027: The amount of lens driving (the number of lens driving pulses) which corresponds to a predetermined amount of defocus is calculated. For example, it is assumed that the required defocus magnification "n"

is 50, the aperture value "F" is 2.8, the minimum circle of confusion "$\sigma$" is 0.035 mm, the lens movement pitch "d" is 0.005 mm and the operational sensitivity of the lens "s" is 1.0. In addition, it is assumed that the first cycle of exposure in the multiple exposure photography is executed with the photographic lens 51 placed in an in-focus position and with the minimum circle of confusion "$\sigma$" being 0.035 mm and the aperture value "F" being 2.8. In this case, if it is desired that the second cycle of exposure in the multiple exposure photography be executed with the photographic lens 51 defocused by a predetermined amount (50·F·$\sigma$), the amount of lens driving is obtained by carrying out the following calculations:

$$\begin{aligned} P &= \{(n \times F \times \sigma)/s\}/d \\ &= \{(50 \times 2.8 \times 0.0035)/1.0\}/0.005 \\ &= 875 \text{ (pulses)} \end{aligned}$$

Step 1028: The amount of driving of the photographic lens 51, calculated in Step 1027, is inputted to the lens unit controlling circuit 55 incorporated in the photographic lens unit 50.

Step 1029: The motor (not shown) is reversed to rotate the mirror driving shaft 41, thereby causing the main mirror 42 to move down to the original position. During this time, the submirror 43 folded on the reverse side of the main mirror 42 returns to the original position with the downward movement of the main mirror 42. Shutter charging is also performed in interlocked relation to the downward movement of the main mirror 42.

Step 1030: The motor (not shown) is reversed to rotate the mirror driving shaft 41 in a direction opposite to the rotating direction of Step 1029, thereby causing the main mirror 42 to move up toward the viewfinder side. During this time, the submirror 43 moves up with the upward movement of the main mirror 42, and is finally folded on the reverse side of the main mirror 42.

Step 1031: It is determined whether the photographic lens 51 driven in Step 1028 has stopped. If it is determined that the photographic lens 51 has not yet stopped, the process waits for the photographic lens 51 to stop. If it is determined that the photographic lens 51 has stopped, the process proceeds to Step 1032.

Step 1032: It is determined whether the photographic lens 51 driven in Step 1028 was able to move by the predetermined amount (the predetermined amount of defocus) calculated in Step 1027. If it is determined that the photographic lens 51 was not able to move by the predetermined amount, it is determined that the photographic lens 51 has reached the closest-distance end, and the process proceeds to Step 1033. If it is determined that the photographic lens 51 was able to move by the predetermined amount, the process proceeds to Step 1038.

Step 1033: If either of the following conditions is satisfied, it is determined that reverse driving of the photographic lens 51 is not needed:

$$Pr > 0.70 \times P \quad (1)$$

$$Pr > 0.35 \times D/d \quad (2)$$

where P represents the amount of lens driving (the predetermined amount of lens driving) calculated in Step 1027, Pr represents the amount of actual lens driving by which the photographic lens 51 was able to be actually moved, and D represents the maximum amount of defocus of the photographic lens 51.

More specifically, if the amount of actual lens driving "Pr" is not less than 70% of the predetermined amount "P" or not less than 35% of D/d (the maximum number of lens driving pulses), it is determined that reverse driving of the photographic lens 51 is not needed. The above condition (1) means that if Pr reaches 70% of P, a soft-focus effect can be obtained, while the above condition (2) means that if Pr reaches 35% of the maximum number of lens driving pulses, the probability that a desired amount of defocus can be obtained is low even if the photographic lens 51 is reversed.

Step 1034: It is determined whether reverse driving of the photographic lens 51 is needed. If it is determined that the reverse driving is needed, the process proceeds to Step 1038. If it is determined that the reverse driving is not needed, the process proceeds to Step 1035.

Step 1035: The amount of reverse driving "Px" is found by using the equation "Px=−(P+Pr)" from both the amount of lens driving "P" calculated in Step 1027 and the amount of actual lens driving "Pr" by which the photographic lens 51 was able to actually move.

Step 1036: The amount of reverse driving Px of the photographic lens 51, calculated in Step 1035, is inputted to the lens unit controlling circuit 55 incorporated in the photographic lens unit 50, thereby starting reverse driving of the photographic lens 51.

Step 1037: It is determined whether the photographic lens 51 driven in Step 1036 has stopped. If it is determined that the photographic lens 51 has not yet stopped, the process waits for the photographic lens 51 to stop If it is determined that the photographic lens 51 has stopped, the process proceeds to Step 1038.

Step 1038: The running start timing of each of the leading and trailing curtains 32 and 33 of the focal plane shutter is set on the basis of the shutter speed and the aperture value memorized in Step 1009. Simultaneously, the amount of driving of the electromagnetically driven diaphragm device 54 in the photographic lens unit 50 is set. Then, the soft-focus photography mode is temporarily cancelled and the process returns to Step 1018.

The foregoing is a description of a series of operations of the above-described embodiment. The calculations of the amount of exposure executed in Step 1009 will be described below in more detail.

Although there are numerous opinions on the definition of a correct amount of exposure, the correct amount of exposure is in general defined as 0.075 to 0.1 [lux·sec] with respect to a film having a film speed of 100. If 0.08 [lux·sec] is assumed to be the correct amount of exposure, the product of the amount of exposure "H" and a film speed "S" is:

$$H \times S = 8.0$$

Since the amount of exposure "H" is given as the product of an illumination intensity "I" in an image plane and an effective exposure time "T", the following relational expression is available:

$$H = I \times T = k \times (B \times T/F^2)$$

where B represents a subject luminance, F represents an aperture value and k represents a coefficient such as the transmission factor of a lens.

From the relational expression of the amount of exposure "H" and a definition expression of an EV value, the EV value can be calculated as follows:

$$EV = \log_2(F^2/T)$$
$$= \log_2\{(k \times B \times s)/8.0\}$$

where the subject luminance "B" is obtained as a measured-light value outputted from the light measuring sensor 23. Then, on the basis of the EV value obtained from the above calculations, if the photographic mode is the normal photography mode, a combination of a shutter speed and an aperture value is set in accordance with a predetermined program chart. In the case of the soft-focus photography mode, a combination of a shutter speed and an aperture value is set in accordance with a dedicated program chart. In addition, in the case of the soft-focus photography mode, a shutter speed and an aperture value for the first cycle of exposure in the multiple exposure photography and those for the second cycle of exposure in the multiple exposure photography, are set in accordance with a desired soft-focus effect so that a correct exposure can be achieved through a plurality of exposure cycles.

According to the above-described embodiment, if the photographic mode of the camera is merely set to the soft-focus photography mode by a photographer, a multiple exposure function is automatically set and the exposure value of each exposure cycle in the multiple exposure photography is determined on the basis of a measured-light value so that a correct multiple exposure effect can be achieved, and an exposure compensation is automatically effected. In addition, the amount of defocus required to create an optimum soft-focus effect during defocused photography is automatically set. Accordingly, even a beginner can easily enjoy soft-focus photography without the need for rich experience, special knowledge or photographic knacks.

During the defocused photography in which the photographic lens is driven to move toward the closest-distance side, since the possibility that any subject other than a main subject exists on the closest-distance side is low, there is no substantial possibility that an in-focus image other than the main subject is photographed. Accordingly, it is possible to obtain a photograph of satisfactory soft-focus effect.

In the description of the aforesaid embodiment, reference is made to the example in which the number of exposure cycles of the multiple exposure photography is two. However, after the first cycle of exposure has been executed with the photographic lens placed in an in-focus position, two or more exposure cycles may be carried out with the photographic lens placed in a defocused position. In addition, in this case, the amount of defocus of the defocused photographic lens may be varied in each exposure cycle.

As is apparent from the foregoing description, an arrangement according to the above embodiment is provided with special-photography executing means which is arranged in the following manner. When the special photography mode is selected through mode selecting means and a shutter release operation is performed, the special-photography executing means controls focus-position altering means and exposure controlling means to shoot one exposure on a photosensitive portion of film with a photographic optical system placed in an in-focus position and continuously shoot at least one exposure on the same photosensitive portion with the photographic optical system placed in a defocused position, thereby carrying out multiple exposure photography. During photography with the special photography mode selected, the special-photography executing means continuously carries out one exposure on the photosensitive portion with the photographic optical system placed in the in-focus position and at least one exposure with the photographic optical system placed in the defocused position on the same photosensitive portion.

Accordingly, it is possible to realize special-effect photography without forcing a photographer to perform a complicated operation.

In addition, since an aperture value for the first cycle of exposure in multiple exposure photography and that for the second and subsequent exposure cycles in the multiple exposure photography are fixed, it is possible to easily determine exposure values for use in the multiple exposure photography. In addition, the complexity of a photographic operation for the multiple exposure photography can be decreased to rapidly perform a photographic operation between each exposure cycle during the multiple exposure photography. Accordingly, it is possible to reduce the time interval between each exposure cycle in the multiple exposure photography. In addition, it is possible to prevent a camera shake or an image shake due to the motion of a subject in a scene which is being photographed, whereby it is possible to realize photography of satisfactory soft-focus effect.

According to the above-described embodiment, there is provided a camera having an electromagnetically driven diaphragm device which is normally open and, when energized, is stopped down to a predetermined aperture value and, when again energized, is restored to the initial open state. In the first cycle of exposure in multiple exposure photography, the electromagnetically driven diaphragm device is energized and set to a predetermined aperture value. Subsequently, the electromagnetically driven diaphragm device remains fixed to the predetermined aperture value until the completion of the final exposure cycle in the multiple exposure photography. Accordingly, since it is possible to shorten the time required for a stopping-down operation in each exposure cycle in the multiple exposure photography, it is possible to reduce the time interval between each exposure cycle in the multiple exposure photography.

In addition, after the electromagnetically driven diaphragm device has been energized in the first cycle of exposure in the multiple exposure photography, the electromagnetically driven diaphragm device is not energized until the completion of the final exposure cycle in the multiple exposure photography. Accordingly, it is possible to restrain power consumption.

In almost all situations in which the soft-focus photography mode is selected as a photographic mode, a subject is stationary. In addition, if a servo AF mode is active, a camera operation may be temporarily set to a shutter release priority mode and a photographer may not be able to perform photography even during an in-focus state. For these reasons, after an in-focus state is once reached, the camera operation is fixed to a one-shot AF mode in which the in-focus state is held. Accordingly, it is possible to prevent the problem that none of the exposure cycles of the multiple exposure photography is performed and no intended spacial effect is obtained.

According to the above-described embodiment, merely by selecting the soft-focus photography mode utilizing multiple exposure photography, it is possible to automatically set the amount and direction of defocus of a photographic lens which are required to create an optimum soft-focus effect. Accordingly, even a beginner can easily enjoy soft-focus photography without the need for rich experience, special knowledge or a photographic knack.

According to the above-described embodiment, during the soft-focus photography mode utilizing multiple exposure photography, lens driving is executed so that a predetermined amount of defocus according to both the distance to a subject and the kind of lens unit used can be obtained to create an intended soft-focus effect. Accordingly, if a photographic lens reaches the closest-distance end of the lens unit before the predetermined amount of defocus is obtained, the photographic lens is driven in the reverse direction to move from its in-focus position toward the infinity end. Accordingly, even a beginner can easily enjoy soft-focus photography without the need for rich experience, special knowledge or a photographic knack.

According to the above-described embodiment, during the soft-focus photography mode utilizing multiple exposure photography, even in a case where no predetermined amount of defocus required to create an intended soft-focus effect is obtained, it is possible to achieve a tolerable soft-focus effect free from an image shake, although a perfect soft-focus effect is not obtained. More specifically, it is possible to create a tolerable soft-focus effect even in a case where since a photographic lens reaches its closest-distance end before a predetermined amount of defocus is obtained, the photographic lens is driven in the reverse direction to move toward its infinity end but reaches the infinity end before the predetermined amount of defocus is obtained.

Figure 6:
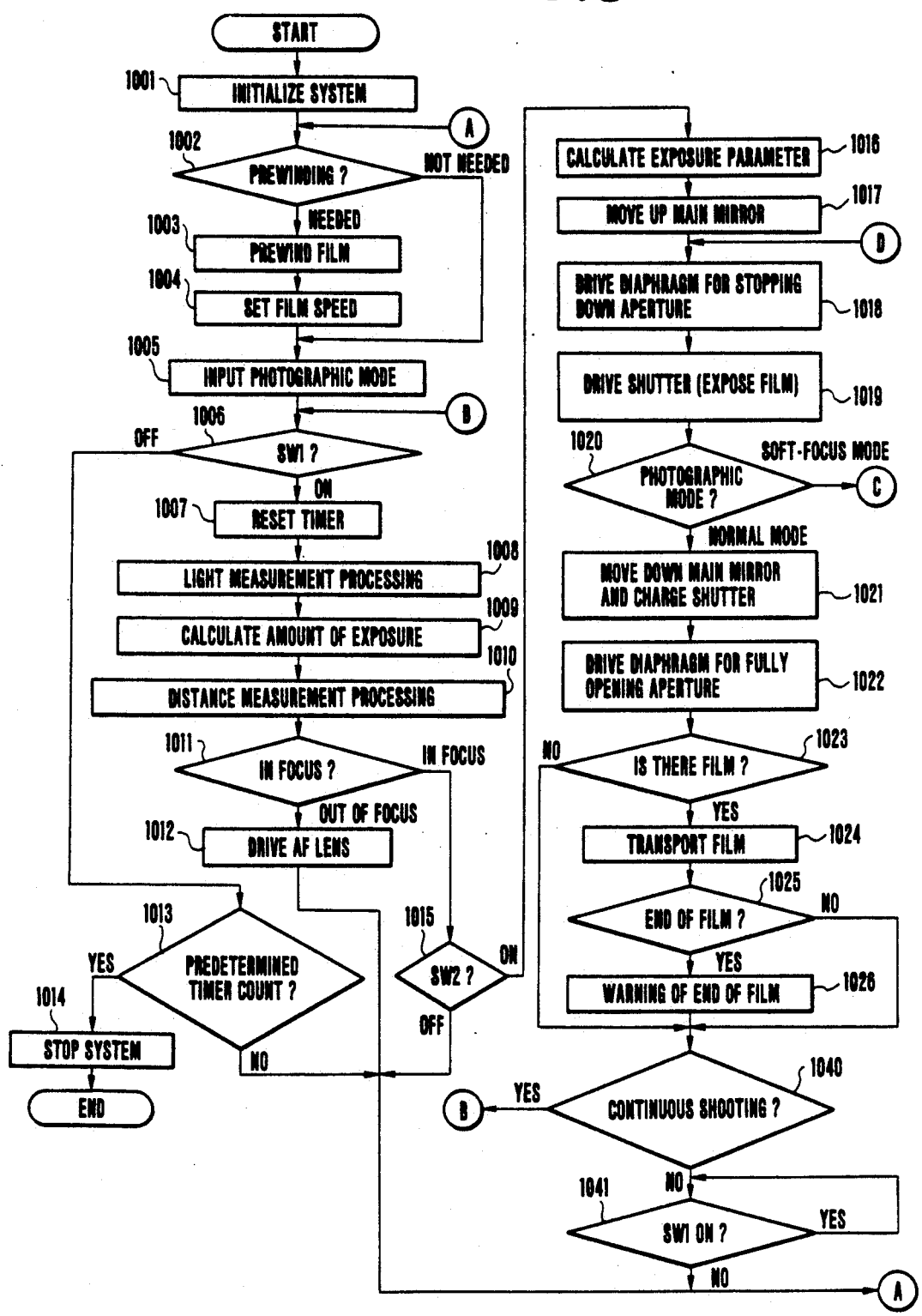
FIG. 6 is a flowchart showing the operation of a microcomputer used in the second embodiment of the present invention.
Figure 7:
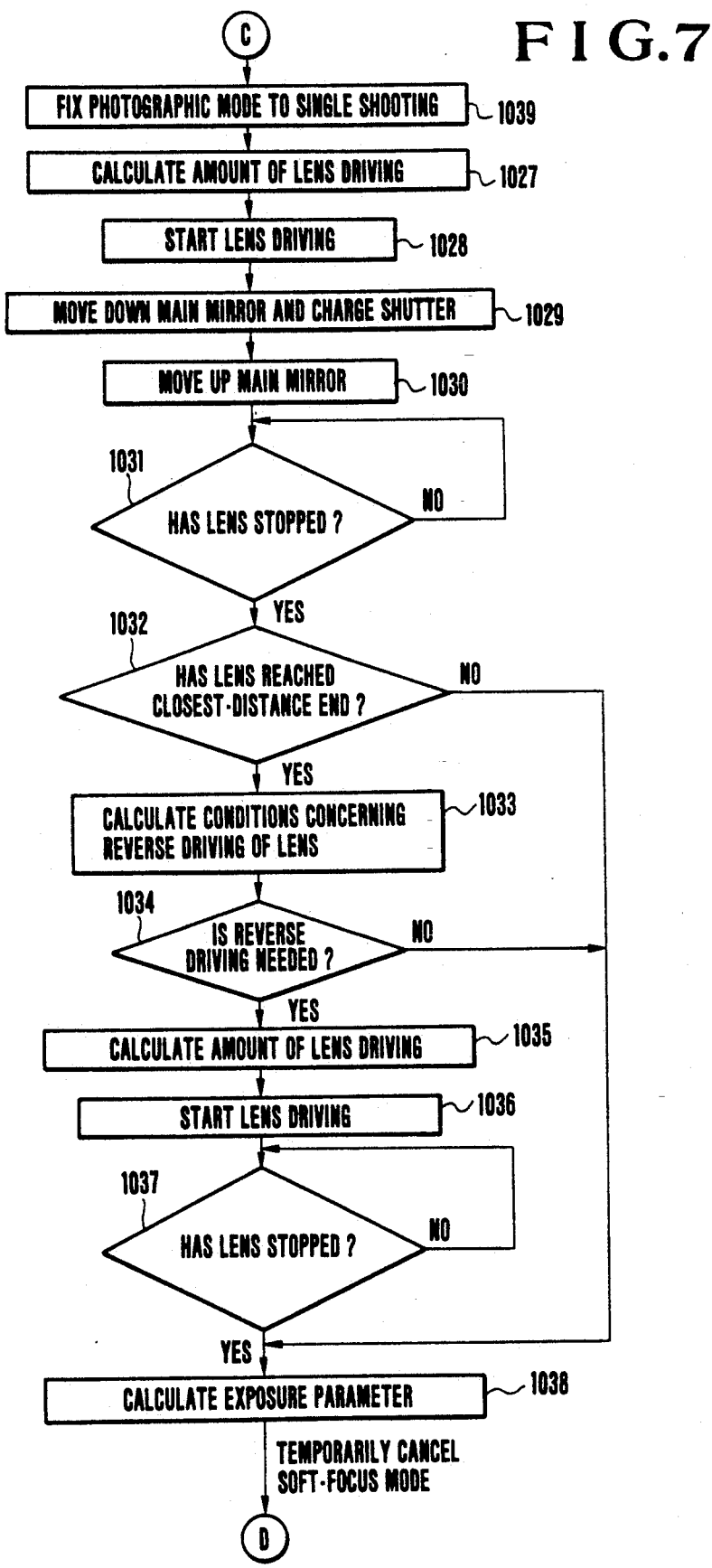
FIG. 7 is a flowchart showing a continuation of the operation shown in FIG. 6.

A second embodiment will be described below. FIGS. 6 and 7 are flowcharts showing the operation of a camera according to the second embodiment. In the flowcharts shown in FIGS. 6 and 7, Step 1039 is inserted between Steps 1020 and 1027 of the flowchart of FIG. 5, and Steps 1040 and 1041 are added after Step 1026.

The following description refers to the portion of each of FIGS. 6 and 7 which differs from FIG. 5.

Step 1026: A warning of the end of the film is given to a photographer, and any operation other than film replacement is inhibited. The process returns to Step 1040.

Step 1040: It is determined whether a normal single shooting mode or a continuous shooting mode has been selected. In the case of the normal single shooting mode, the process proceeds to Step 1041, while in the case of the continuous shooting mode, the process returns to Step 1006.

Step 1041: It is determined whether the release button remains pressed down to the first stroke position, that is, whether the activating switch SW1 remains on. If the activating switch SW1 remains on, the process waits for the activating switch SW1 to be turned off. If the activating switch SW1 is turned off, the process returns to Step 1002.

In the above-described manner, while the activating switch SW1 remains on, the photographic sequence executed during that time does not come to an end. Accordingly, even if the release button remains erroneously pressed down, it is possible to prevent exposure of the next frame from being performed, that is, it is possible to prevent continuous shooting from being erroneously performed.

If it is determined in Step 1020 that the soft-focus photography mode s selected, the process proceeds to Step 1039 shown in FIG. 7, as described above.

Step 1039: The photographic mode is fixed to the normal single shooting mode, and the process proceeds to Step 1027.

All the steps other than the above-described steps are similar to those shown in FIG. 5.

According to the second embodiment, while the soft-focus photography mode is selected, even if the release button remains erroneously pressed down, the process does not proceed to the next photographic sequence as far as the activating switch SW1 is on. Accordingly, even if the release button remains erroneously pressed down, the continuous shooting is not activated, whereby it is possible to prevent occurrence of an unintended photograph.

A third embodiment of the present invention will be described below.

Figure 8:
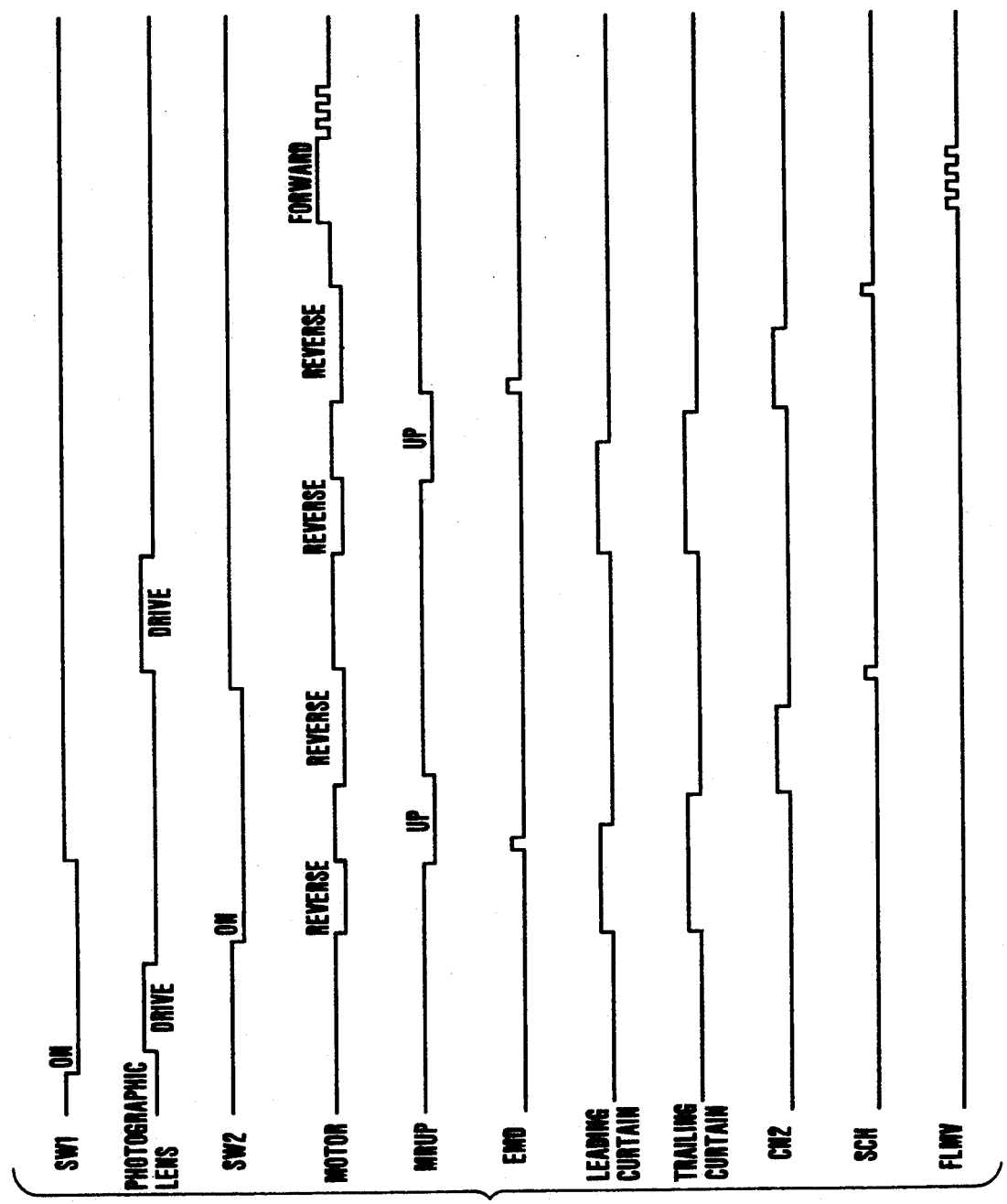
FIG. 8 is a timing chart showing the operation of soft-focus photography according to the third embodiment of the present invention.

FIG. 8 is a timing chart showing the operation of soft-focus photography which is executed when the source voltage of the camera is not greater than a predetermined value. The following explanation will be made in connection with the timing chart of FIG. 8.

Steps which are executed from the step of pressing the release button to the step in which a running of the shutter trailing curtain 33 is completed after the completion of the first cycle of exposure in multiple exposure photography, are the same as those shown in FIG. 4 which has been referred to in the description of the first embodiment.

When the signal CN2 indicative of the completion of the running of the trailing curtain 33 goes to the high level, the motor is again reversed to cause the main mirror 42 to start moving downward, and the signal MRUP indicative of a mirror-up state goes to the high level. Simultaneously, shutter charging is executed, whereafter the signal CN2 indicative of the completion of the running of the trailing curtain 33 goes to the low level. The reverse driving of the motor is continued until the shutter charging completion signal SCH is generated. When the aforesaid shutter charging is completed, the photographic lens 51 is driven to move by a predetermined amount for the purpose of a defocused exposure which constitutes the second cycle of exposure in the multiple exposure photography. If the driving of the photographic lens 51 by the predetermined amount is completed, the reverse driving of the motor is immediately executed and an exposure sequence for the second cycle of exposure in the multiple exposure is started.

The subsequent sequence up to the step of completing the release sequence of the soft-focus photography and transporting the film, is similar to the corresponding sequence shown in FIG. 4.

Figure 9:
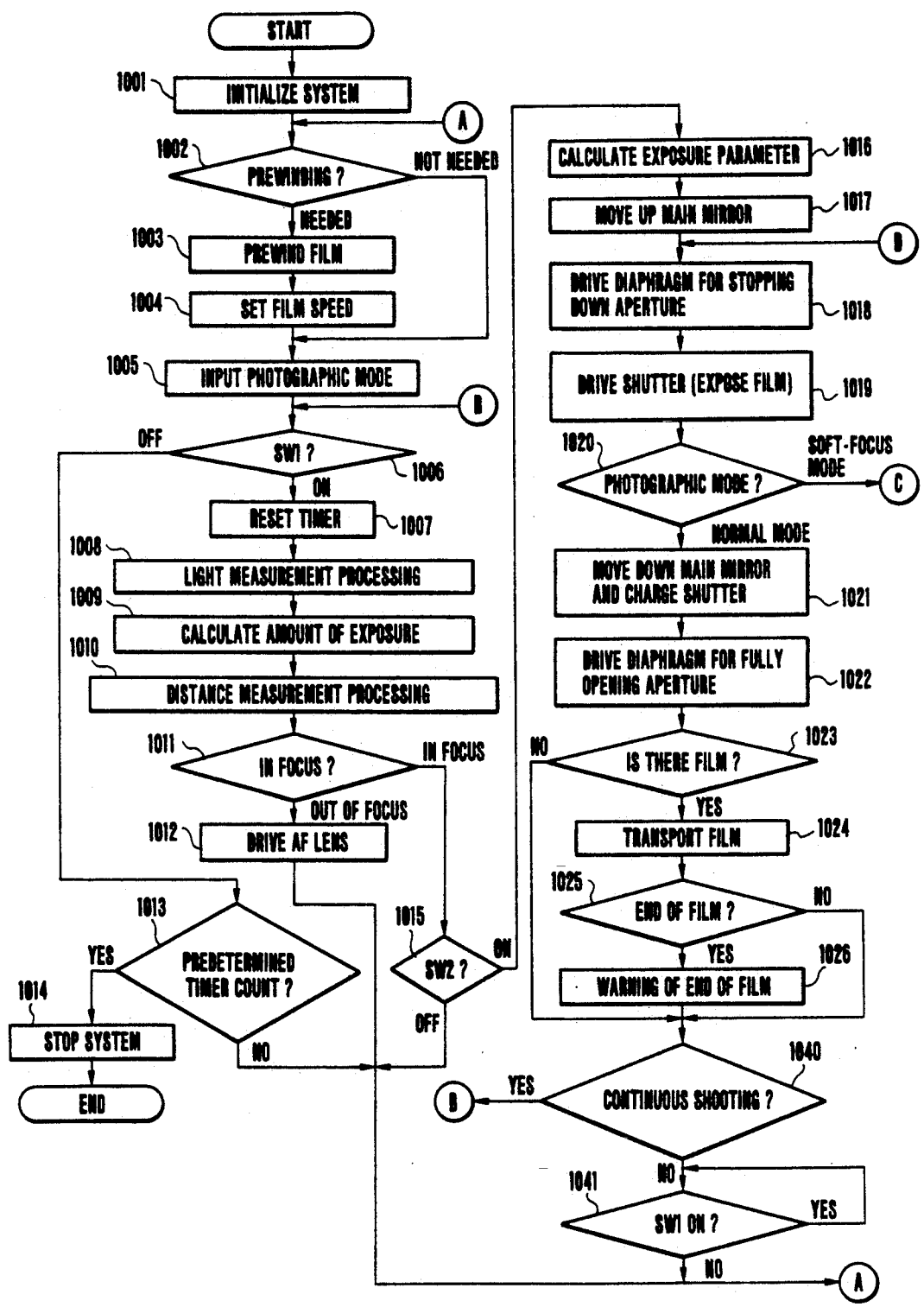
FIG. 9 is a flowchart showing the operation of a microcomputer used in the third embodiment of the present invention.
Figure 10:
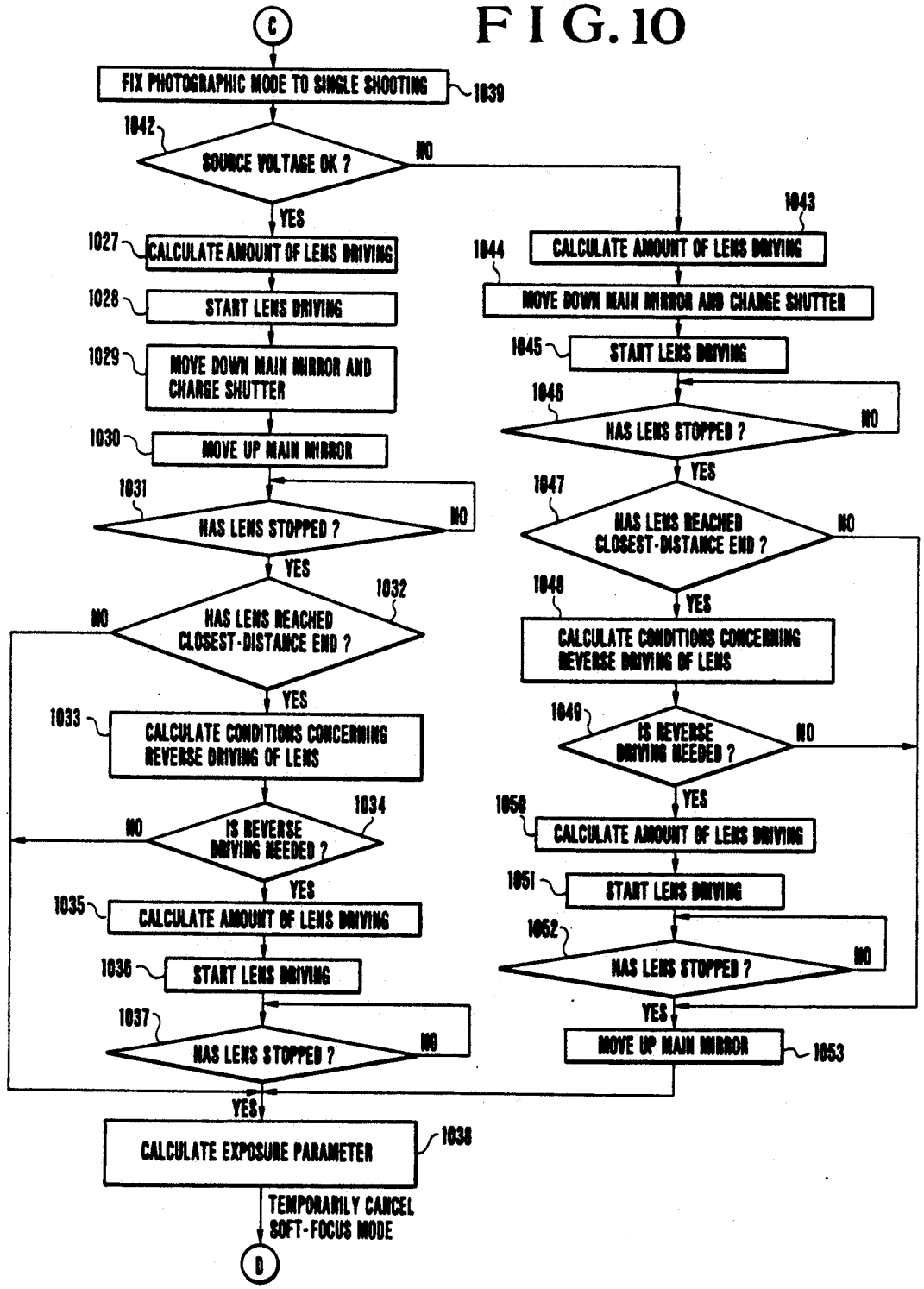
FIG. 10 is a flowchart showing a continuation of the operation shown in FIG. 9.

FIGS. 9 and 10 are flowcharts showing the operation of the microcomputer 1 of the camera according to the third embodiment. In FIGS. 9 and 10, steps 1042 to 1053 are added to the flowcharts shown in FIGS. 6 and 7 which have been referred to in the description of the second embodiment. The following description will be given in connection with steps 1042 to 1053.

Step 1039: The photographic mode is fixed to the normal single shooting mode, and the process proceeds to Step 1042.

Step 1042: It is determined whether the source voltage is not less than a predetermined value which is high enough to cause shutter charging and upward movement of the main mirror 42 at the same time. If it is determined that the source voltage is not less than the predetermined value, the process proceeds to Step 1027. If it is determined that the source voltage is not greater then the predetermined value, the process proceeds to Step 1043.

Step 1043: The amount of lens driving (the number of lens driving pulses) which corresponds to a predetermined amount of defocus is calculated.

Step 1044: The motor (not shown) is reversed to rotate the mirror driving shaft 41, thereby causing the main mirror 42 to move down to the original position. During this time, the submirror 43 folded on the reverse side of the main mirror 42 returns to the original position with the downward movement of the main mirror 42. Shutter charging is also performed in interlocked relation to the downward movement of the main mirror 42.

Step 1045: The amount of driving of the photographic lens 51 for defocusing purpose, calculated in Step 1043, is inputted to the lens unit controlling circuit 55 incorporated in the photographic lens unit 50.

Step 1046: It is determined whether the photographic lens 51 driven in Step 1045 has stopped. If it is determined that the photographic lens 51 has not yet stopped, the process waits for the photographic lens 51 to stop. If it is determined that the photographic lens 51 has stopped, the process proceeds to Step 1047.

Step 1047: It is determined whether the photographic lens 51 driven in Step 1045 was able to move by the predetermined amount (the predetermined amount of defocus) calculated in Step 1043. If it is determined that the photographic lens 51 was not able to move by the predetermined amount, it is determined that the photographic lens 51 has reached the closest-distance end, and the process proceeds to Step 1048. If it is determined that the photographic lens 51 was able to move by the predetermined amount, the process proceeds to Step 1049.

Step 1048: If either of the following conditions is satisfied, it is determined that reverse driving of the photographic lens 51 is not needed:

$$Pr > 0.70 \times P \quad (1)$$

$$Pr > 0.35 \times D/d \quad (2)$$

where P represents the amount of lens driving (the predetermined amount) calculated in Step 1043, Pr represents the amount of actual lens driving by which the photographic lens 51 was able to be actually moved, and D represents the maximum amount of defocus of the photographic lens 51.

More specifically, if the amount of actual lens driving "Pr" is not less than 70% of the predetermined amount "P" or not less than 35% of D/d (the maximum number of lens driving pulses), it is determined that reverse driving of the photographic lens 51 is not needed. The above condition (1) means that if Pr reaches 70% of P, a soft-focus effect can be obtained, while the above condition (2) means that if Pr reaches 35% of the maximum number of lens driving pulses, the probability that a desired amount of defocus can be obtained is low even if the photographic lens 51 is reversed.

Step 1049: It is determined whether reverse driving of the photographic lens 51 is needed. If it is determined that the reverse driving is needed, the process proceeds to Step 1053. If it is determined that the reverse driving is not needed, the process proceeds to Step 1050.

Step 1050: The amount of reverse driving "Px" is found by using the equation "Px = −(P+Pr)" from both the amount of lens driving "P" calculated in Step 1043 and the amount of actual lens driving "Pr" by which the photographic lens 51 was able to actually move.

Step 1051: The amount of reverse driving "Px" of the photographic lens 51, calculated in Step 1050, is inputted to the lens unit controlling circuit 55 incorporated in the photographic lens unit 50, thereby starting reverse driving of the photographic lens 51.

Step 1052: It is determined whether the photographic lens 51 driven in Step 1051 has stopped. If it is determined that the photographic lens 51 has not yet stopped, the process waits for the photographic lens 51 to stop. If it is determined that the photographic lens 51 has stopped, the process proceeds to Step 1053.

Step 1053: The motor (not shown) is reversed to rotate the mirror driving shaft 41 in a direction opposite to the rotating direction of Step 1044, thereby causing the main mirror 42 to move up toward the viewfinder side. During this time, the submirror 43 moves up with the upward movement of the main mirror 42, and is finally folded on the reverse side of the main mirror 42. Then, the process proceeds to Step 1038.

All the steps other than the above-described steps are similar to those shown in FIGS. 6 and 7 which have been referred to in connection with the second embodiment.

According to the third embodiment, if the soft-focus mode using the multiple exposure photography is selected, a check is made as to the state of the source voltage of the camera. If the source voltage is not less than a predetermined value, shutter charging and lens driving are executed at the same time. If the source voltage is not greater than the predetermined value, shutter charging and lens driving are not executed at the same time so that the soft-focus photography can be securely executed as far as it is possible, that is, the shutter charging and the lens driving are executed serially in time so that it is possible to prevent a large load from instantaneously being applied to the source voltage.

A fourth embodiment of the present invention will be described below.

Figure 11:
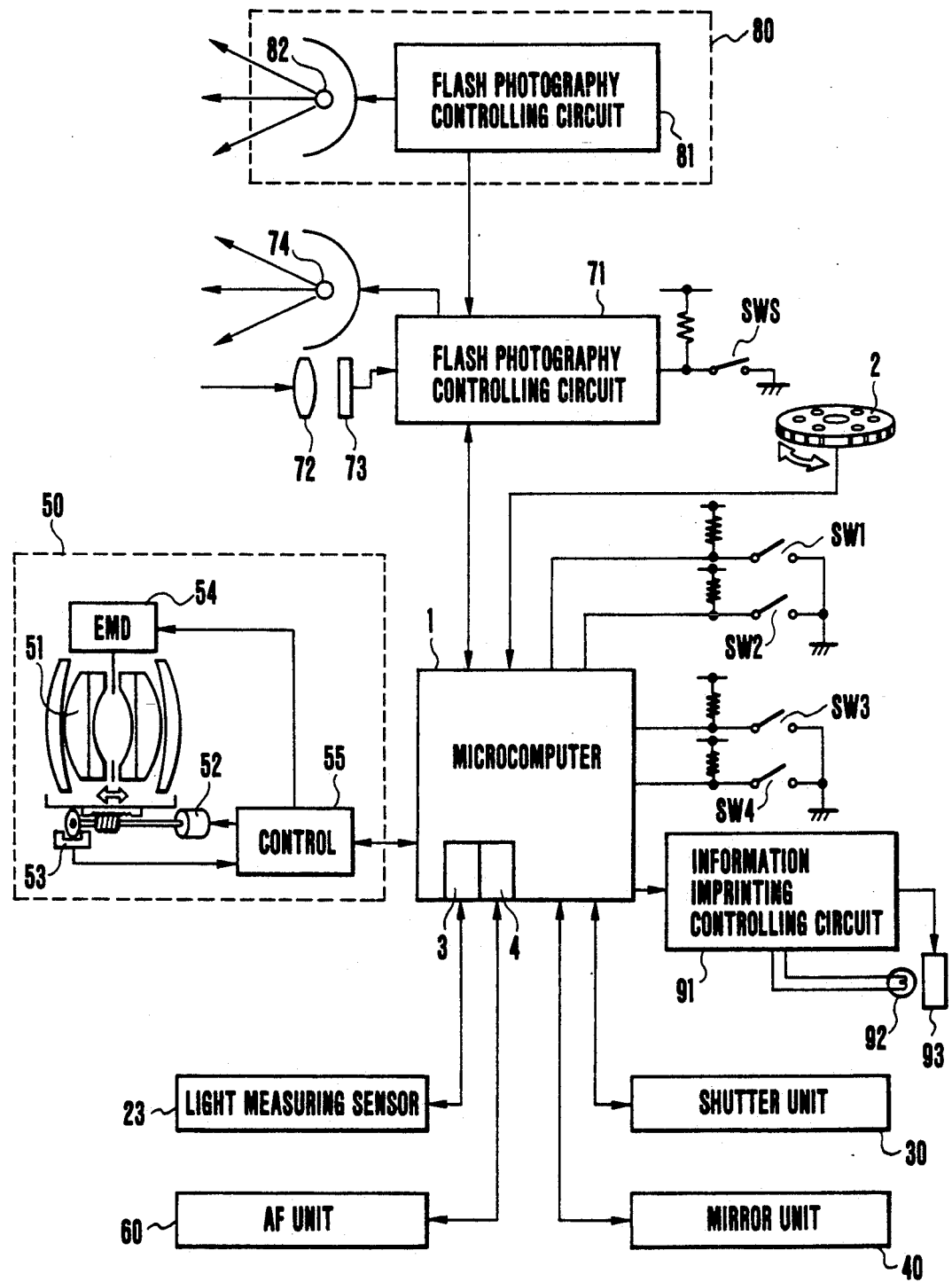
FIG. 11 is a schematic view showing the arrangement of a camera according to a fourth embodiment of the present invention.

FIG. 11 is a schematic block diagram showing the arrangement of a camera having a special photography function according to the fourth embodiment. In FIG. 11, the same reference numerals are used to denote elements which are substantially identical to those shown in FIG. 1 which has been referred to in connection with the first embodiment. Description of the elements which are substantially identical to those shown in FIG. 1 is omitted for the sake of simplicity.

The arrangement shown in FIG. 11 includes a flash photography controlling circuit 71 of a built-in type flash unit, a built-in type light receiving lens 72, a built-in type light receiving sensor 73 a flash discharge tube 74 of the built-in type flash unit, and a switch SWS. The switch SWS is operated to input a flash photography instruction to the flash photography controlling circuit 71, and if an externally-attachable type flash unit which will be described later is attached to the camera, a flash photography instruction to execute flash photography using the externally-attachable type flash unit is inputted to the flash photography controlling circuit 71.

The arrangement shown in FIG. 11 also includes an externally-attachable type flash unit 80, a flash photography controlling circuit 81 of the externally-attachable type flash unit 80, and a flash discharge tube 82 of the externally-attachable type flash unit 80.

The arrangement shown in FIG. 11 also includes an information-imprinting controlling circuit 91 for controlling imprinting of information, such as the year/-month/day of photography, on film, an information imprinting light emitting diode 92, and an information imprinting liquid-crystal display 93. These elements constitute a data imprinting device.

Figure 12:
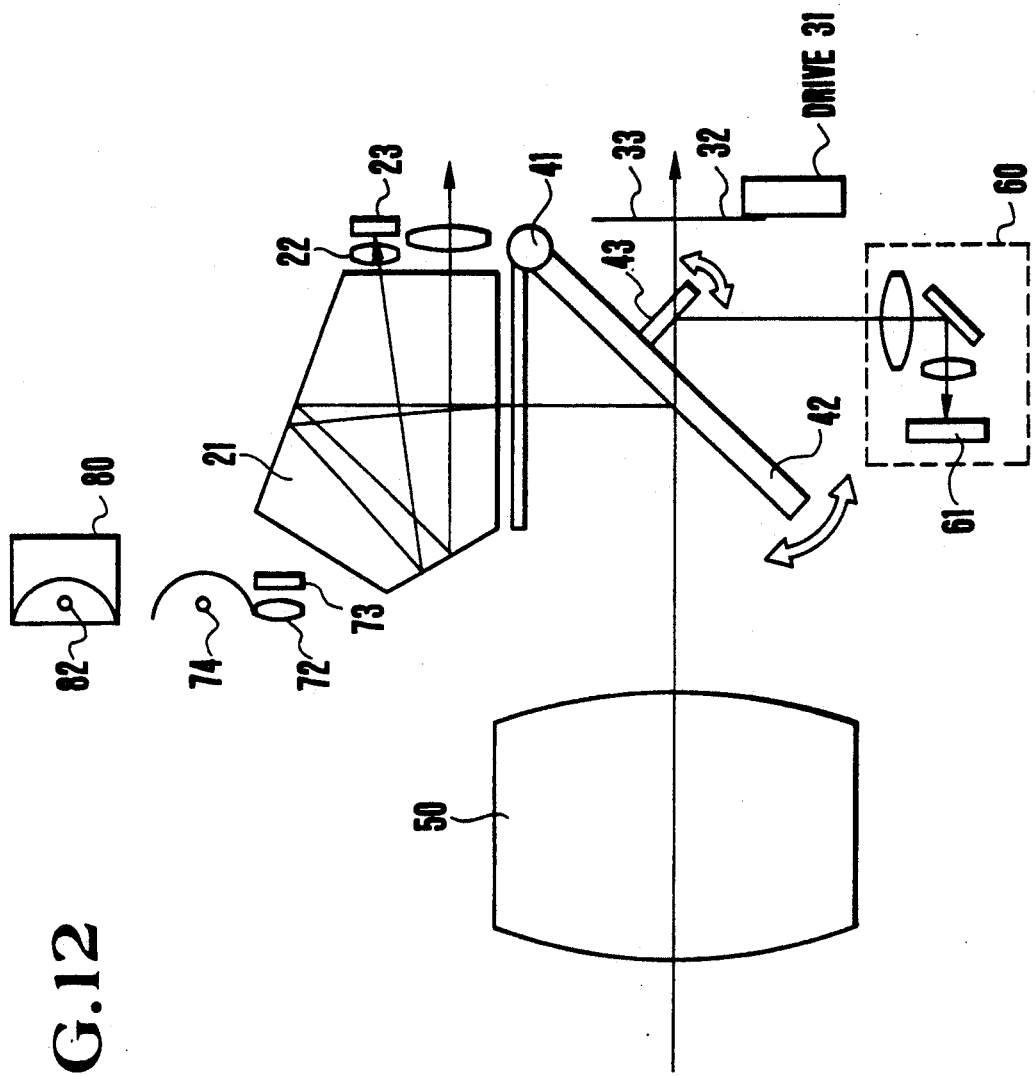
FIG. 12 is a schematic view showing a light measuring system and an AF system which are incorporated in the camera according to the fourth embodiment of the present invention.

FIG. 12 is a schematic view showing a light measuring system and an AF system which are incorporated in the camera. In FIG. 12, the same reference numerals are used to denote elements which are substantially identical to those shown in FIG. 2 or 11.

An exposure sequence of the camera will be described below with reference to FIGS. 11 and 12.

When the release button is pressed down to the second stroke position, the release starting button SW2 is turned on to start the release sequence.

More specifically, the microcomputer 1 drives the motor (not shown) to cause the main mirror 42 to move up toward the viewfinder side (by means of the mirror driving shaft 41). As the main mirror 42 moves up, the submirror 43 is folded on the reverse side of the main mirror 42, so that the submirror 43 does not intercept the optical path extending between the photographic lens 51 and the film plane. When the main mirror 42 completes moving up to the viewfinder side, the microcomputer 1 instructs the focal plane shutter driving device 31 to cause the leading curtain of the focal plane shutter to run. Thus, the first cycle of exposure in multiple exposure photography is started. After the passage of a shutter time based on exposure computations, the microcomputer 1 instructs the focal plane shutter driving device 31 to cause the trailing curtain 33 of the focal plane shutter to run. Thus, the first cycle of exposure in the multiple exposure photography for the film is ended. If flash photography is to be executed, the microcomputer 1 sends to the flash photography controlling circuit 71 an instruction to cause the flash discharge tube 74 to start flashing, after the completion of the running of the leading curtain 32 of the focal plane shutter and before a running of the trailing curtain 33 of the focal plane shutter.

Then, the microcomputer 1 drives the motor to cause the main mirror 42 to move down from the viewfinder side. As the main mirror 42 moves down, the submirror 43 folded on the reverse side of the main mirror 42 is restored to the original position. Simultaneously with the downward movement of the main mirror 42, the shutter driving spring is charged. Then, the photographic lens 51 is driven to shift its focus position in a defocusing direction by a predetermined amount in preparation for the second cycle of exposure in the multiple exposure photography. Then, the microcomputer 1 drives the motor to cause the main mirror 42 to move up to the viewfinder side. At this point in time, if it is necessary to shorten the processing time required to execute the above-described operations, the driving of the photographic lens 51 and the driving of the main mirror 42 may be executed at the same time. When the driving of the photographic lens 51 and the upward movement of the main mirror 42 are ended, the microcomputer 1 instructs the focal plane shutter driving device 31 to cause the leading curtain 32 of the focal plane shutter to run, as in the case of the first cycle of exposure. Thus, the second cycle of exposure in the multiple exposure is started. After the passage of a specified time, the microcomputer 1 instructs the focal plane shutter driving device 31 to cause the trailing curtain 33 of the focal plane shutter to run. Thus, the second cycle of exposure in the multiple exposure photography for the film is ended. However, even if the flash photography instruction has been inputted, no flash photography is executed during the second cycle of exposure in the multiple exposure photography. Then, the microcomputer 1 drives the motor to cause the main mirror 42 to move down from the viewfinder side. As the main mirror 42 moves down, the submirror 43 folded on the reverse side of the main mirror 42 is restored to the original position. Simultaneously with the downward movement of the main mirror 42, the shutter driving spring is charged.

In the above-described manner, the first and second cycles of exposure in the multiple exposure photography for the same frame of the film are completed and the film is then transported by one frame in preparation for exposure of the next frame.

The operation executed in the soft-focus photography is similar to that explained in connection with FIGS. 3(a), 3(b) and 3(c) which have been referred to in the description of the first embodiment.

Figure 13:
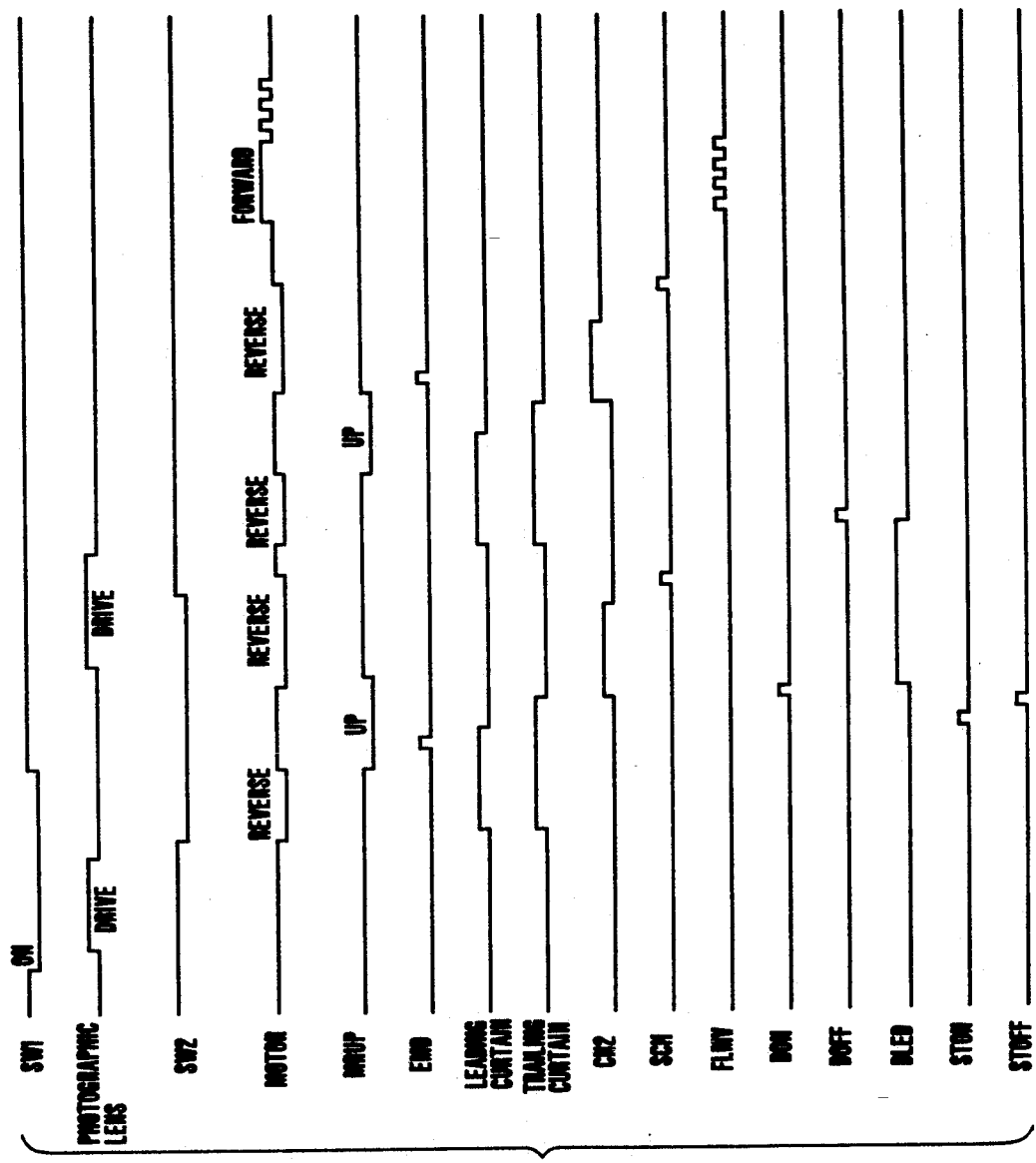
FIG. 13 is a timing chart showing an operation executed during soft-focus photography in the fourth embodiment of the present invention.

FIG. 13 is a timing chart showing the operation of the soft-focus photography. Since the shutter mechanism of the camera according to the fourth embodiment is similar to that of the first embodiment, description thereof is omitted.

The information imprinting device made up of the elements 91, 92 and 93 shown in FIG. 11 is arranged to cause the light emitting diode 92 to light up to sensitize a film surface through the liquid-crystal device 93, thereby imprinting information such as a date. The information imprinting device is also arranged to control the light-up time duration of the light emitting diode 92 in accordance with the film speed (ISO speed) of the film used, thereby effecting an appropriate amount of exposure. Accordingly, according as the ISO speed of the film used becomes lower, the light-up time duration of the light emitting diode 92 is made longer by the information imprinting device, with the result that information imprinting takes a longer time.

The operation of the camera will be described below with reference to the timing chart of FIG. 13.

In the timing chart of FIG. 13, parts associated with the aforesaid information imprinting are added to those of the timing chart of FIG. 4. The operation of the shutter mechanism of the camera according to the fourth embodiment is similar to that of the first embodiment which has been described with reference to FIG. 4. The operation of the shutter mechanism will be described below with reference to only steps associated with an information imprinting operation, and description of the other steps is omitted for the sake of simplicity.

As described previously in connection with FIG. 4, the energization of the electromagnet for the shutter leading curtain 32 is stopped to allow the leading curtain 32 to run. After the passage of a shutter time based on exposure computations, the energization of the electromagnet for the shutter trailing curtain 33 is stopped to allow the trailing curtain 33 to run. At this time, an emission start signal DON for causing the light emitting diode 92 (indicated by "DLED" in FIG. 13) to emit light is generated at the timing when the energization of the trailing curtain electromagnet is stopped (refer to FIG. 13), thereby causing the light emitting diode 92 to light up. After the passage of the light-up time duration of the light emitting diode 92 which provides an appropriate amount of exposure according to the film speed of the film used, a signal DOFF, which informs the light emitting diode 92 of the timing when the emission of the light emitting diode 92 is to be stopped, is generated (refer to FIG. 13), thereby stopping the emission of the light emitting diode 92. More specifically, before the emission stop signal DOFF for the light emitting diode 92 is generated, when the signal CN2 indicative of the completion of the running of the trailing curtain 33 goes to the high level, the motor is again reversed to cause the main mirror 42 to start moving downward, and the signal MRUP is turned off ("high"). Simultaneously, shutter charging is executed, whereafter the siqnal CN2 indicative of the completion of the running of the trailing curtain 33 goes to the low level. The reverse driving of the motor is continued until the shutter charging completion signal SCH is generated ("high").

The subsequent steps are similar to the steps which have been referred to in the description of FIG. 4.

Figure 14:
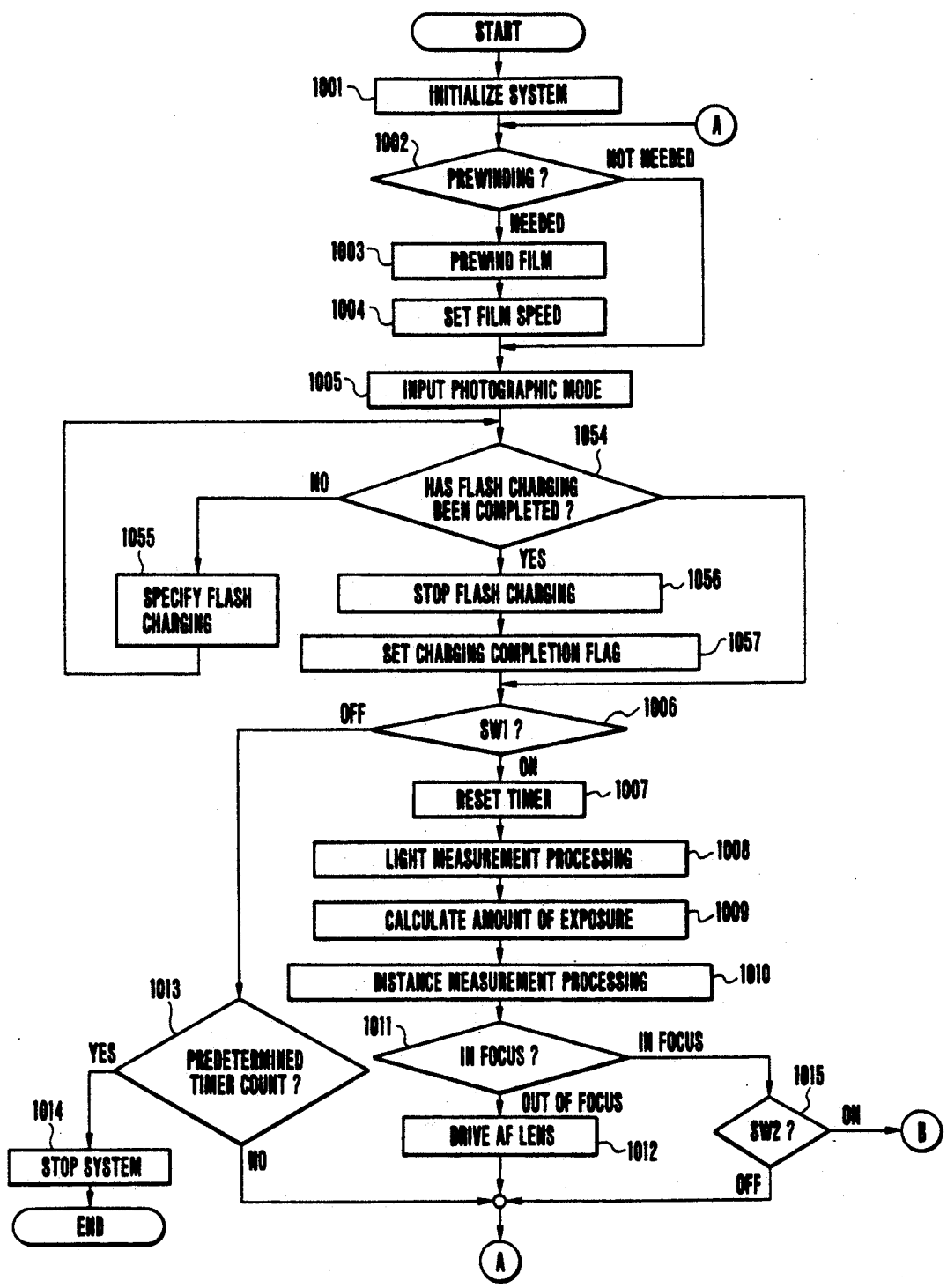
FIG. 14 is a flowchart showing the operation of a microcomputer used in the fourth embodiment of the present invention.
Figure 15:
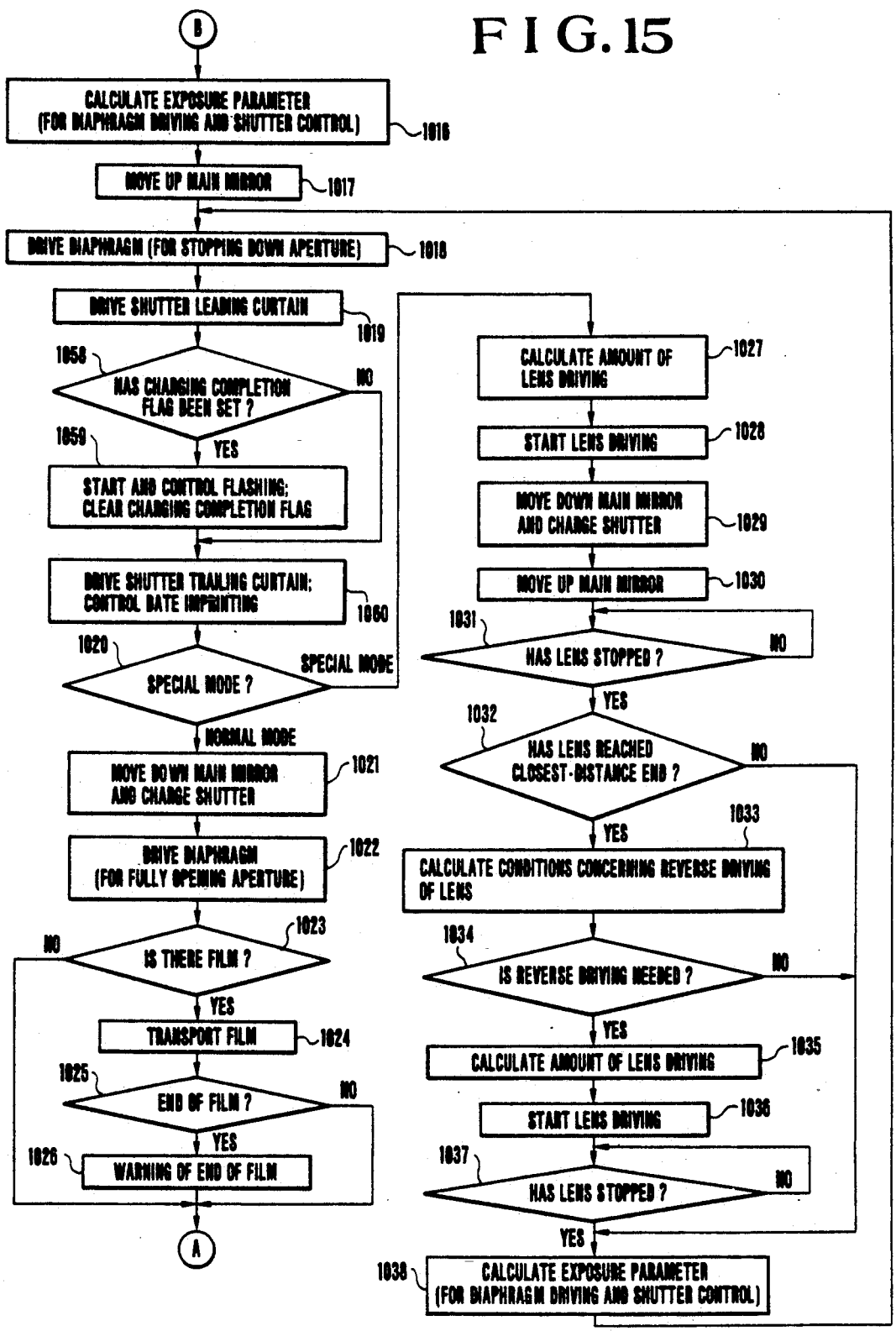
FIG. 15 is a flowchart showing a continuation of the operation shown in FIG. 14.

FIGS. 14 and 15 are flowcharts showing the operation of the microcomputer 1 of the camera according to the fourth embodiment shown in FIG. 11. In FIGS. 14 and 15, steps 1054 to 1057 are inserted between steps 1005 and 1006 of the flowchart of FIG. 5, and steps 1058 to 1060 are inserted between steps 1019 and 1020 of the same flowchart. Description of steps common to those shown in FIG. 5 is omitted for the sake of simplicity.

First of all, steps 1054 to 1057 will be described below.

Step 1054: If an instruction to execute photography using stationary light is memorized in Step 1005, the process proceeds to Step 1006. If an instruction to execute flash photography is given in Step 1005, it is determined whether the charging of the main capacitor of the flash unit has been completed. If it is determined that the charging has not yet been completed, the process proceeds to Step 1055. If it is determined that the charging has been completed, the process proceeds to Step 1056.

Step 1055: Since the charging has not yet been completed, an instruction to continue the charging is inputted to the flash photography controlling circuit 71, and the process returns to Step 1054. This loop is repeated until the charging of the main capacitor is completed.

Step 1056: Since the charging of the main capacitor of the flash unit is completed, an instruction to stop charging is inputted to the flash photography controlling circuit 71.

Step 1057: A charging completion flag is set.

Steps 1058 to 1060 will be described below.

Step 1058: It is determined whether the flash charging flag is set. If it is determined that the flash charging flag is set, the process proceeds to Step 1059; otherwise, the process proceeds to Step 1060.

Step 1059: The charging completion flag is reset, and an instruction to start flashing is inputted to the flash photography controlling circuit 71 in synchronism with the completion of running of the leading curtain 32. If the externally-attachable type flash unit 80 is not attached, the flash photography controlling circuit 71 which has received the instruction signal causes the flash discharge tube 74 to emit light. Thereafter, when light reflected from a subject, which is detected by the light receiving lens 72 and the light receiving sensor 73, reaches a predetermined amount, the flash photography controlling circuit 71 stops the emission of the flash discharge tube 74. If the externally-attachable type flash unit 80 is attached, the flash photography controlling circuit 71 outputs an emission instruction signal to an externally-attachable type flash photography controlling circuit 81, and causes the flash discharge tube 82 to emit light. Thereafter, when light reflected from a subject, which is detected by the light receiving lens 72 and the light receiving sensor 73, reaches a predetermined amount, the flash photography controlling circuit 71 outputs an emission stop signal to the externally-attachable type flash photography controlling circuit 81, and stops the emission of the flash discharge tube 82.

Step 1060: Shutter driving control is executed in accordance with the running start timing of the trailing curtain 33 of the focal plane shutter, which has been set in Step 1016, whereby the exposure of the film to a subject image is brought to an end. In the case of the first cycle of exposure in the multiple exposure photography which is executed during the normal photography mode or the soft-focus photography mode, an information imprint instruction is inputted to the information imprinting controlling circuit 91 at the time when the trailing curtain 33 starts running.

The subsequent steps are similar to the corresponding steps shown in FIG. 5.

The exposure computations executed in Step 1009 are similar to those explained in connection with FIG. 5, and description thereof is omitted. In the fourth embodiment, if necessary, the following control is executed in addition to the exposure computations executed in Step 1009. If a flash photography instruction is inputted, the emission of the flash discharge tube 74 is controlled through the flash photography controlling circuit 71 so that the amount of exposure becomes 0.1 lux·sec, on the basis of the aperture value and the film speed which have been determined in Step 1016. In the arrangement shown in FIG. 12, the light receiving lens 72 and the light receiving sensor 73 are attached to the exterior part of the camera. However, if flashed light is conducted to the light receiving sensor 73 through the photographic lens unit 50 (the photographic lens 51), the emission of the flash discharge tube 74 is controlled through the flash photography controlling circuit 71 so that the amount of exposure becomes 0.1 lux·sec, on the basis of the film speed only.

In the description of the above-described fourth embodiment, reference is made to the example in which the number of exposure cycles of the multiple exposure photography is two. However, after the first cycle of exposure has been executed with the photographic lens placed in an in-focus position, two or more exposure cycles may be carried out with the photographic lens placed in a defocused position. In addition, in this case, the amount of defocus of the defocused photographic lens may be varied in each exposure cycle.

According to the above-described fourth embodiment, merely by setting the photographic mode of the camera to the soft-focus photography mode, a multiple exposure function is automatically set. At the same time, an exposure value for each exposure cycle in multiple exposure photography is automatically set on the basis of a measured-light value, whereby an exposure compensation is automatically applied so that an appropriate multiple exposure effect can be obtained. In addition, the amount of defocus of a photographic lens for defocused photography, which is required to create an optimum soft-focus effect, is also automatically set, whereby even a beginner can easily enjoy soft-focus photography without the need for rich experience, special knowledge or a photographic knack.

In addition, during the aforesaid soft-focus photography, since the first cycle of exposure in the multiple exposure photography is carried out with the photographic lens placed in an in-focus place, it is possible to take a photograph of a main subject without missing a shutter opportunity. In the case of photography with the photographic lens defocused, since at least the main subject is not in focus, a soft-focus effect is not substantially affected even if the timing of a shutter release operation is somewhat offset from the shutter opportunity.

In addition, since information such as a date is automatically imprinted on film only in the first cycle of exposure in the multiple exposure photography, it is not necessary to insert the processing step of waiting for the passage of the time duration required to imprint the information, in each exposure cycle during the multiple exposure photography. In addition, it is not necessary to perform computations for controlling the imprinting time duration in each exposure cycle in the multiple exposure photography so that the multiple exposure photography can obtain an appropriate result. Accordingly, since it is possible to omit the time duration required to perform such computations and the time duration required for communication between an information imprinting device and a microcomputer, it is possible to shorten the time interval between each exposure cycle in the multiple exposure photography. Accordingly, it is possible to prevent a camera shake or an image shake due to the motion of a subject in a scene which is being photographed, whereby it is possible to realize photography of satisfactory soft-focus effect. In addition, since the process proceeds to the sequence of the second cycle of exposure in the multiple exposure photography before the completion of information imprinting, the above-described effect becomes more outstanding.

Since information imprinting is executed during an exposure cycle with a main subject in focus, it is possible to imprint information distinctly with respect to the main subject, as in the case of the normal photography mode.

In addition, since flashing is only executed during an exposure cycle in the multiple exposure photography with the photographic lens placed in an in-focus place, it is not necessary to incorporate the processing step of waiting for the passage of the time duration required to charge the main capacitor of a flash unit so that flashing can be executed in the next exposure cycle. Accordingly, it is possible to reduce the time interval between each of the subsequent exposure cycles. In consequence, it is possible to prevent a camera shake or an image shake due to the motion of a subject in a scene which is being photographed, whereby it is possible to realize photography of satisfactory soft-focus effect.

In nighttime photography, by executing the above-described control, it is possible to achieve photography having an outstanding special effect in which only a main subject is sharply photographed against a soft-focus background. If the camera is placed under aperture-priority exposure control, it is automatically set to slow shutter-speed sync in the case of a dark place in nighttime photography. Even if flashing is executed, the main subject and the background can be appropriately exposed, whereby a photographer can easily enjoy photography having the above-described special effect.

Figure 16:
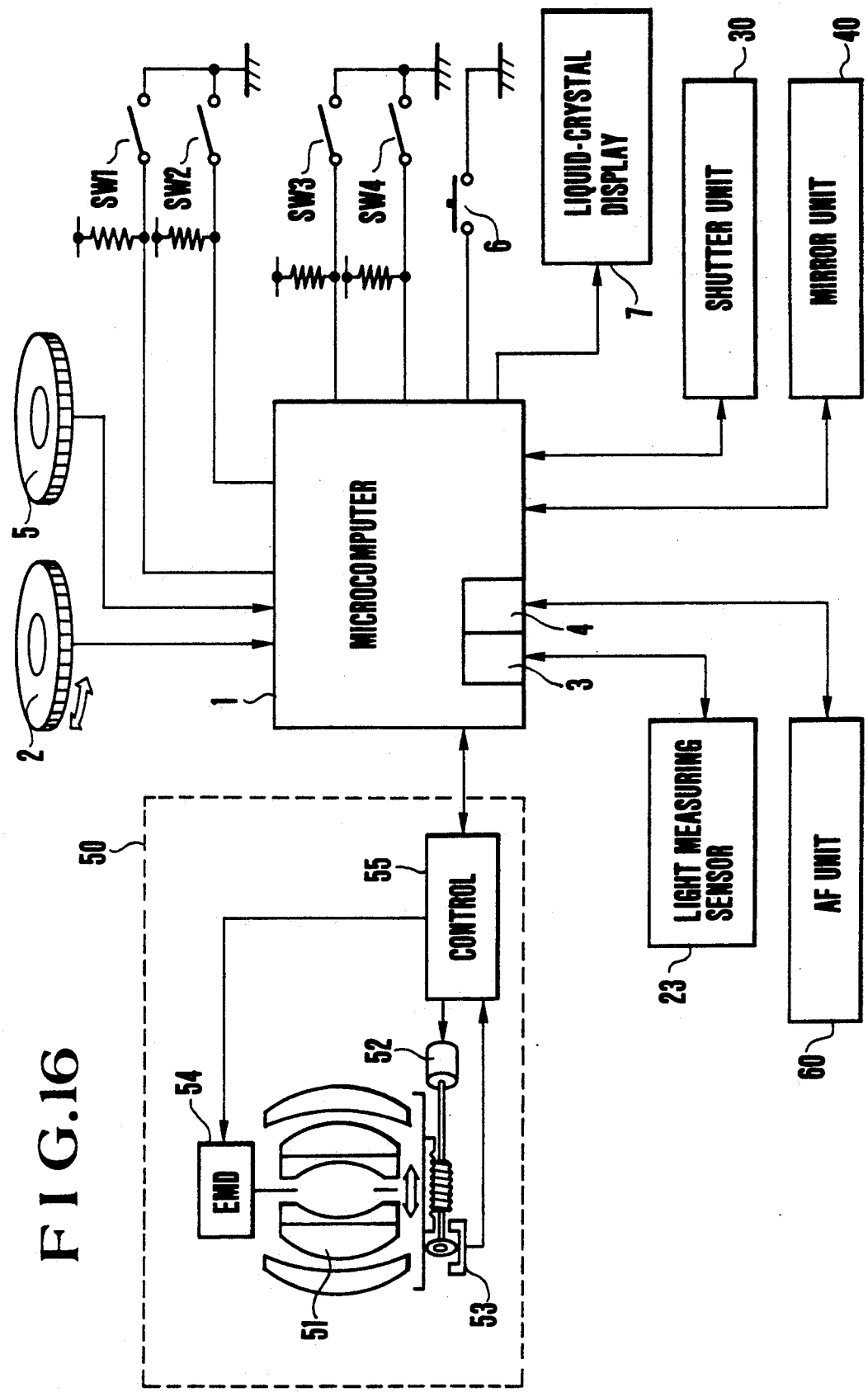
FIG. 16 is a schematic view showing the arrangement of a camera according to a fifth embodiment of the present invention.

FIG. 16 is a schematic block diagram showing the arrangement of a camera having a special photography function according to the fifth embodiment of the present invention. In FIG. 16, the same reference numerals are used to denote elements which are substantially identical to those shown in FIG. 1, and description thereof is omitted for the sake of simplicity.

In FIG. 16, reference numeral 5 denotes an electronic dial, reference numeral 6 denotes an exposure compensation button, and reference numeral 7 denotes a liquid-crystal display.

An exposure sequence of the camera will be described below with reference to FIG. 16.

When the release button is pressed down to the second stroke position, the release starting button SW2 is turned on to start a release sequence.

More specifically, the microcomputer 1 drives the motor (not shown) to cause the main mirror 42 to move up toward the viewfinder side (by means of the mirror driving shaft 41). As the main mirror 42 moves up, the submirror 43 is folded on the reverse side of the main mirror 42, so that the submirror 43 does not intercept the optical path extending between the photographic lens 51 and the film plane. When the main mirror 42 completes moving up to the viewfinder side, the microcomputer 1 instructs the focal plane shutter driving device 31 to cause the leading curtain 32 of the focal plane shutter to run. Thus, the first cycle of exposure in multiple exposure photography is started. After the passage of a shutter time based on exposure computations, the microcomputer 1 instructs the focal plane shutter driving device 31 to cause the trailing curtain 33 of the focal plane shutter to run. Thus, the first cycle of exposure in the multiple exposure photography for the film is ended.

Then, the microcomputer 1 drives the motor to cause the main mirror 42 to move down from the viewfinder side. As the main mirror 42 moves down, the submirror 43 folded on the reverse side of the main mirror 42 is restored to the original position. Simultaneously with the downward movement of the main mirror 42, the shutter driving spring (not shown) is charged. Then, the photographic lens 51 is driven at its maximum speed to shift its focus position in a defocusing direction by a predetermined amount in preparation for the second cycle of exposure in the multiple exposure photography. Then, the microcomputer 1 drives the motor to cause the main mirror 42 to move up to the viewfinder side. At this point in the processing, if it is necessary to shorten the processing time required to execute the above-described operations, the driving of the photographic lens 51 and the driving of the main mirror 42 may be executed at the same time. When the driving of the photographic lens 51 and the upward movement of the main mirror 42 are ended, the microcomputer 1 instructs the focal plane shutter driving device 31 to cause the leading curtain 32 of the focal plane shutter to run, as in the case of the first cycle of exposure. Thus, the second cycle of exposure in the multiple exposure photography is started. After the passage of a specified time, the microcomputer 1 instructs the focal plane shutter driving device 31 to cause the trailing curtain 33 of the focal plane shutter to run. Thus, the second cycle of exposure in the multiple exposure photography for the film is ended. Then, the microcomputer 1 drives the motor to cause the main mirror 42 to move down from the viewfinder side. As the main mirror 42 moves down, the submirror 43 folded on the reverse side of the main mirror 42 is restored to the original position. Simultaneously with the downward movement of the main mirror 42, the shutter driving spring is charged.

In the above-described manner, the first and second cycles of exposure in the multiple exposure photography for a single frame are completed and the film is then transported by one frame in preparation for exposure of the next frame.

An operation executed in the soft-focus photography is similar to that explained with reference to FIGS. 3(a), 3(b) and 3(c) which have been referred to in connection with the first embodiment.

Figure 17A:
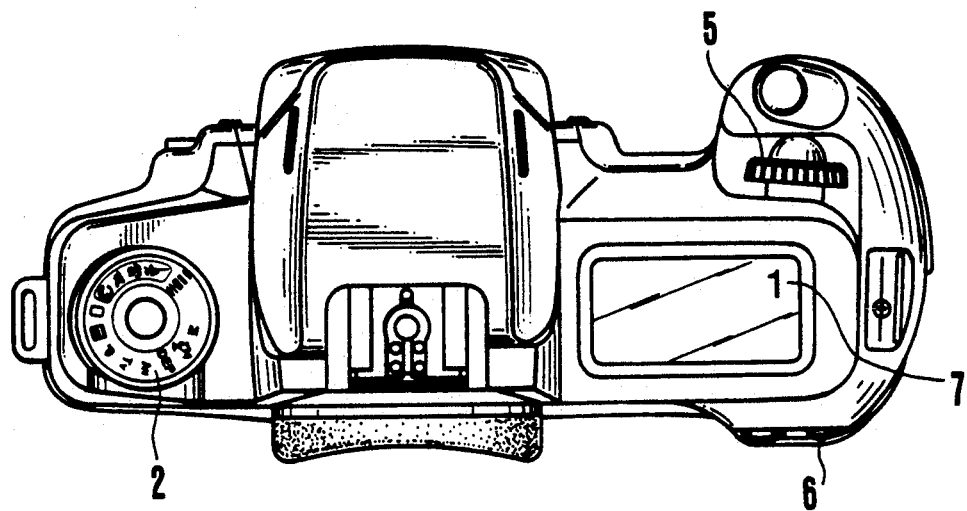
FIGS. 17(a), 17(b) and 17(c) are schematic views showing a camera according to the fifth embodiment of the present invention.

FIG. 17(a) is a schematic top plane view showing a camera having a special photography function according to the fifth embodiment of the present invention. In FIG. 17(a), the same reference numerals are used to denote elements which are substantially identical to those shown in FIG. 16.

An operating method in the soft-focus photography and associated visual displays will be described below with reference to FIGS. 17(a) to 17(c).

In general, in normal multiple exposure photography, since the amount of exposure in each of the first and second cycles of exposure is uniform, the ratio of the exposures effected in both exposure cycles is 1:1. However, the ratio of the exposures is not limited to 1:1, and various other exposure ratios may be utilized to achieve a variety of special effects. In this embodiment, by selecting a desired ratio of exposures from various ratios, it is possible to change the degree of the soft-focus effect, whereby various special effects can be realized. If the amount of exposure in the second cycle of exposure in the multiple exposure photography is made larger than the amount of exposure in the first cycle of exposure in the multiple exposure photography (by varying a shutter speed), an in-focus image becomes thinner and the degree of the soft-focus effect becomes larger. Accordingly, it is necessary to select a correct exposure ratio according to each individual photographic scene to prevent occurrence of a photograph which is merely out of focus.

Figure 17B:
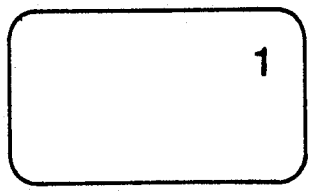
Figure 17C:
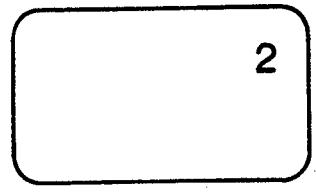

To this end, when the photographic mode dial 2 is set to the soft-focus mode (indicated by a double circle) as shown in FIG. 17(a), "1" is displayed on the liquid-crystal display 7 as shown in FIG. 17(b). That is to say, a mode (softness level 1) is initially set in which the amount of exposure in the first cycle of exposure in the multiple exposure photography is comparatively large and the degree of the soft-focus is small. If a photograph having a larger degree of soft-focus effect is needed, the electronic dial 5 is turned toward the right, and "2" is displayed on the liquid-crystal display 7 as shown in FIG. 17(c). That is to say, a mode (softness level 2) is initially set in which the amount of exposure in the first cycle of exposure in the multiple exposure photography is comparatively small and the degree of the soft-focus is large. In other words, if the electronic dial 5 is turned toward the left, the mode which provides a small degree of soft-focus effect is selected, while if it is turned toward the right, the mode which provides a large degree of soft-focus effect is selected. If an arbitrary amount of exposure compensation is set by turning the electronic dial 5 with the exposure compensation button 6 pressed, the softness level 1 or the softness level 2 is newly set to an exposure value which takes the amount of exposure compensation into account.

If the above-described photographic elements are variously combined, it is possible to arbitrarily set the degree of the soft-focus effect with the camera set to the soft-focus photography mode according to the above-described embodiment.

Figure 18:
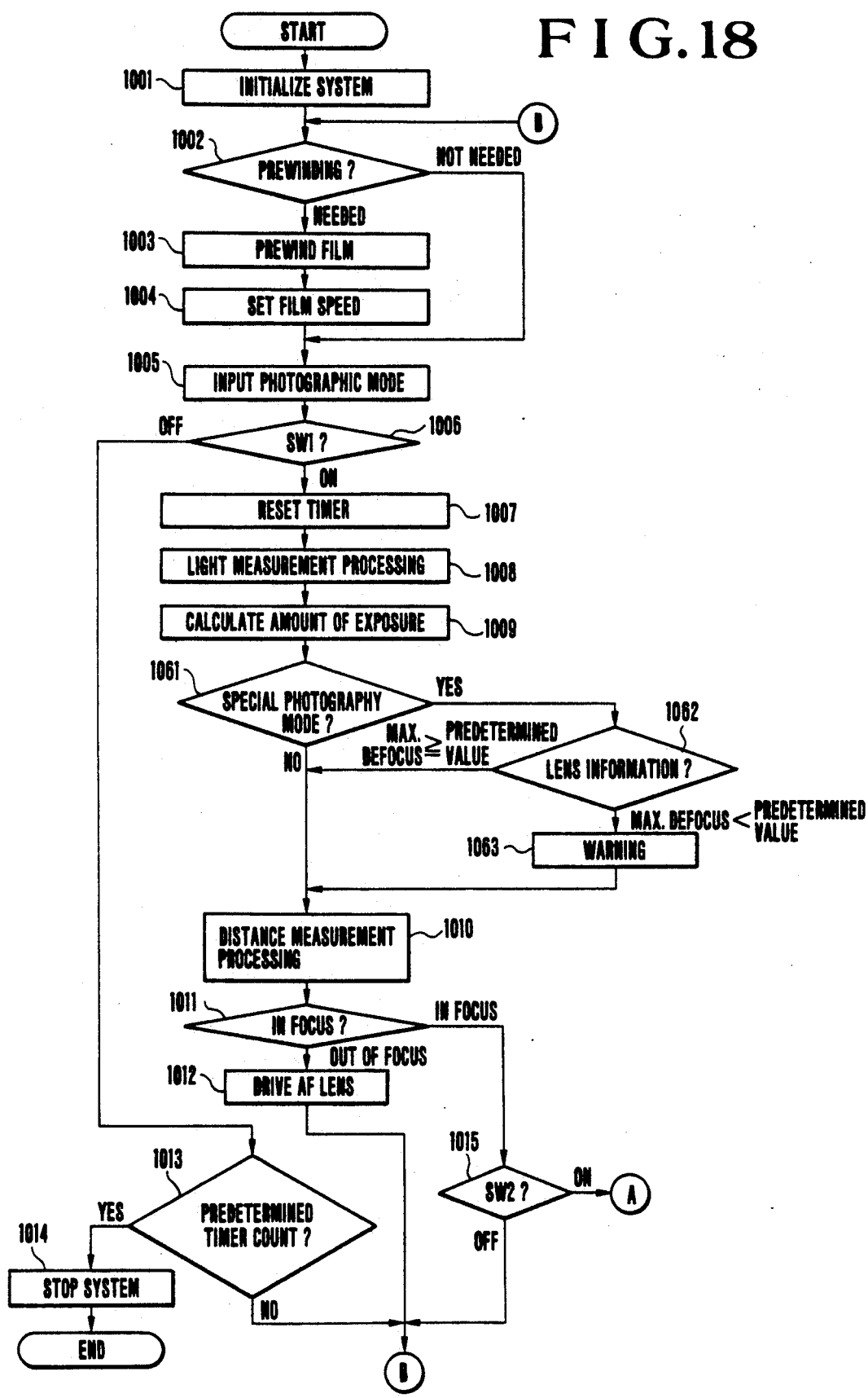
FIG. 18 is a flowchart showing the operation of a microcomputer used in the fifth embodiment of the present invention.
Figure 19:
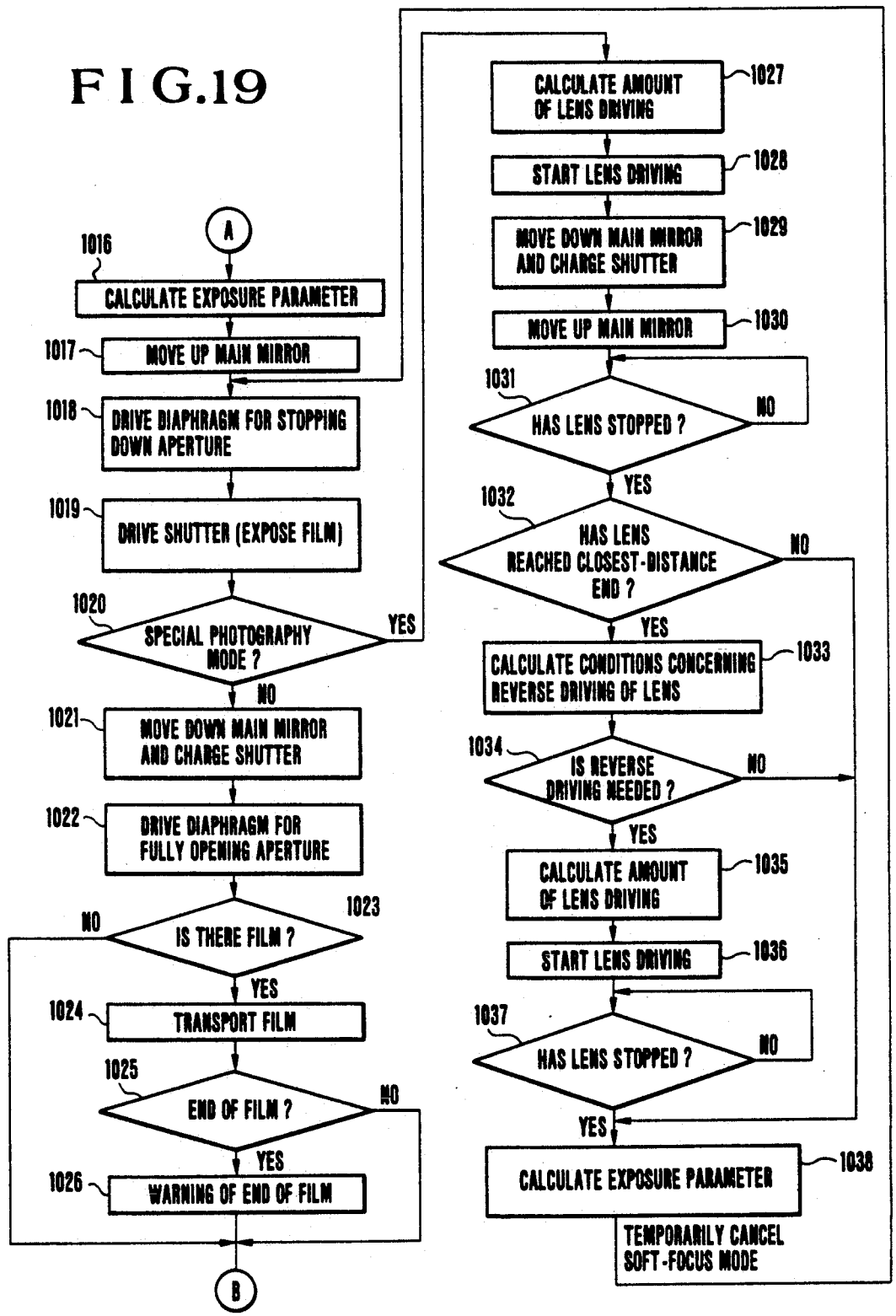
FIG. 19 is a flowchart showing a continuation of the operation shown in FIG. 18.

FIGS. 18 and 19 are flowcharts showing the operation of the microcomputer 1 of the camera according to the embodiment shown in FIG. 16. All the steps other than steps 1061 to 1063 are similar to the corresponding steps of the flowchart of FIG. 5 which shows the operation of the first embodiment. The following description refers to steps 1061 to 1063.

Step 1061: It is determined whether the photographic mode memorized in Step 1005 is the soft-focus mode. In the case of the soft-focus mode which constitutes the special photography mode, the process proceeds to Step 1062, while in the case of any other photography mode, the process proceeds to Step 1010.

Step 1062: Since the photographic mode is the soft-focus mode, it is determined whether the maximum amount of defocus of the attached photographic lens 51 is smaller than a predetermined value ("50Fδ" to be described later). If the maximum amount of defocus is smaller than the predetermined value, the process proceeds to Step 1063. If it is not smaller than the predetermined value, the process proceeds to Step 1010.

Step 1063: Since the maximum amount of defocus of the attached photographic lens 51 is smaller than the predetermined value, a warning indicating that no desired soft-focus effect can be attained is displayed. For example, an external display, such as the softness level "1" or "2" shown in FIG. 17(b) or 17(c), is blinked, or such a warning is displayed within the viewfinder (not shown) as well. A sound warning system such as a buzzer may also be utilized.

All the steps other than the above-described ones are identical to the corresponding steps shown in FIG. 5.

According to the fifth embodiment, the speed of movement of the photographic lens 51 is variable, and the photographic lens 51 is made to move to a predetermined defocused position at its maximum speed after the completion of multiple exposure photography with the photographic lens 51 in focus in the soft-focus mode. Accordingly, it is possible to extremely shorten the time interval between each exposure cycle in the multiple exposure photography, whereby it is possible to minimize the image shake of a subject.

According to the fifth embodiment, in the soft-focus photography, when the first cycle of exposure in the multiple exposure photography with the photographic lens 51 in focus is completed, the photographic lens 51 is made to move by a predetermined amount of defocus and the second cycle of exposure is executed. In some cases, since the maximum amount of defocus of the attached photographic lens 51 may be small, the photographic lens 51 may not be able to be driven by the predetermined amount of defocus. However, a warning to that effect is displayed on the liquid-crystal display 7 so that a photographer can be informed in advance that no sufficient soft-focus effect can be obtained. Accordingly, the photographer can determine whether he/she is to continue the current photography, and it is, therefore, possible to prevent the problem that after the photographer has received a printed result, he/she finds that no sufficient soft-focus effect was obtained.

According to the fifth embodiment, during the soft-focus mode, the electronic dial 5 is operated so that the ratio of an exposure value used with the photographic lens 51 placed in an in-focus position to an exposure value used with the photographic lens 51 placed in a defocused position on the closest-distance side is set to an optimum ratio. Subsequently, merely by executing a release operation, a predetermined number of exposure cycles in the multiple exposure photography are continuously effected on a predetermined frame of film in accordance with an automatically set exposure value. Accordingly, even a beginner can easily take a photography having an intended soft-focus effect without the need for rich experience, special knowledge or a photographic knack.

According to the fifth embodiment, during the soft-focus mode, the exposure compensation button 6 is operated to arbitrarily set at least either one of an exposure compensation value for an exposure cycle executed with the photographic lens 51 placed in an in-focus position and an exposure compensation value for an exposure cycle executed with the photographic lens 51 placed in a defocused position on the closest-distance side. Subsequently, merely by executing a release operation, a predetermined number of exposure cycles in the multiple exposure photography are continuously effected on a predetermined frame of film in accordance with an automatically set exposure value. Accordingly, even a beginner can easily take a photograph having an intended soft-focus effect without the need for rich experience, special knowledge or a photographic knack.

According to the fifth embodiment, when the soft-focus mode is set, an exposure ratio indicating that the amount of exposure executed with the photographic lens placed in an in-focus place is greater than the amount of exposure executed with the photographic lens placed in a defocused position, that is, an exposure ratio suitable for portrait photography which is comparatively frequently performed in the soft-focus mode, is selected from among a plurality of selectable exposure ratios (of the first cycle of exposure to the second cycle of exposure in the multiple exposure photography). Subsequently, merely by executing a release operation, a predetermined number of exposure cycles in the multiple exposure photography are continuously effected on a predetermined frame of film in accordance with an automatically set exposure value. Accordingly, even a beginner can succeed in taking a photograph having a soft-focus effect without the need for rich experience, special knowledge or a photographic knack.

An exposure program used in the multiple exposure photography will be described below.

Figure 20:
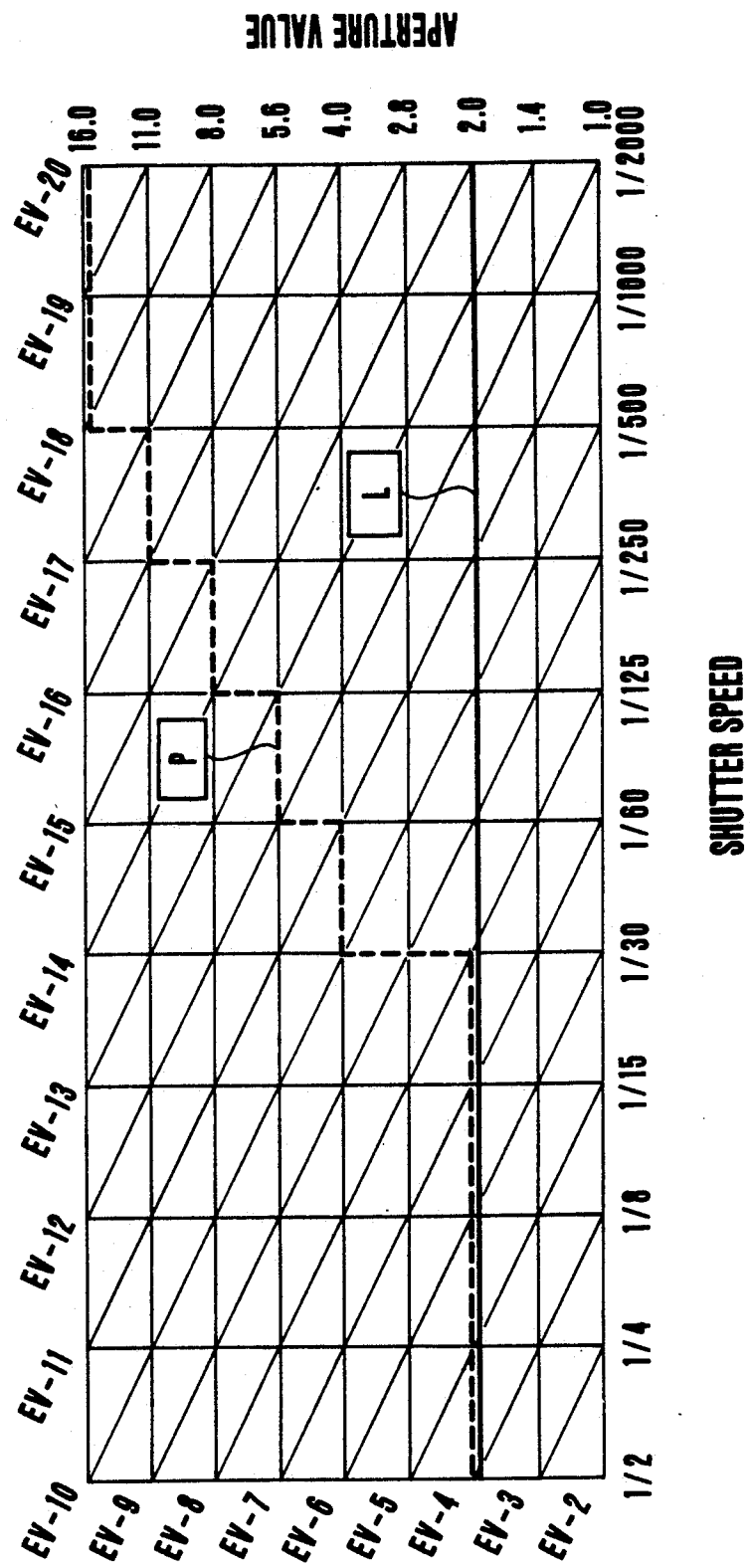
FIG. 20 is a chart representing the exposure control pattern of a conventional camera.

According to a multiple exposure photography method, recent electronic cameras are in general arranged so that the automatic charging of a shutter during multiple exposure photography and associated multiple exposure calculations are automatically controlled in accordance with an exposure program chart such as that shown in FIG. 20. FIG. 20 is a program chart which is applied to a general camera provided with a lens having an open-aperture F number of 2.0. In FIG. 20, a solid line L represents the open-aperture F number, and a dashed line P represents a combination of an aperture value and a shutter speed.

As can be seen from FIG. 20, if it is necessary to execute the first cycle of exposure with the photographic lens 51 in focus and then execute the second cycle of exposure with the photographic lens 51 defocused by a predetermined amount of defocus, an appropriate aperture value relative to a shutter speed of 1/500 second is F11 when film of ISO 400 is used in bright daylight. If it is assumed that the amount of unsharpness which is required to achieve a satisfactory soft-focus effect is 50δ, the amount of defocus becomes 50Fδ. Although "δ" is constant at 0.035 mm (a general minimum circle of confusion for 35 mm film), "F" (aperture value) is extremely large at 11. As a result, the amount of defocus required to form a defocused image in the second cycle of exposure is extremely large, so that a large amount of lens driving is needed. In addition, there is a case where the position of a subject and the maximum amount of forward movement of the photographic lens make it impossible to achieve 50Fδ.

Furthermore, since the degree of the soft-focus effect is altered by varying the exposure ratio of the first cycle of exposure to the second cycle of exposure, if the amount of exposure is to be determined by using the conventional program chart shown in FIG. 20, both a shutter speed and an aperture value need to be altered. However, such an alteration method is inefficient. To alter the aperture value, two ways are available. One way is to stop down the diaphragm of the photographic lens from the open-aperture state thereof to a desired aperture value to be used in the second cycle of exposure. The other way is to drive the diaphragm from an aperture position corresponding to the first cycle of exposure to an aperture position corresponding to the second cycle of exposure. However, both ways have problems to be solved. In the former way, it takes an extremely long time to re-drive the diaphragm, while the latter way requires accurate driving of diaphragm blades.

Figure 21A:
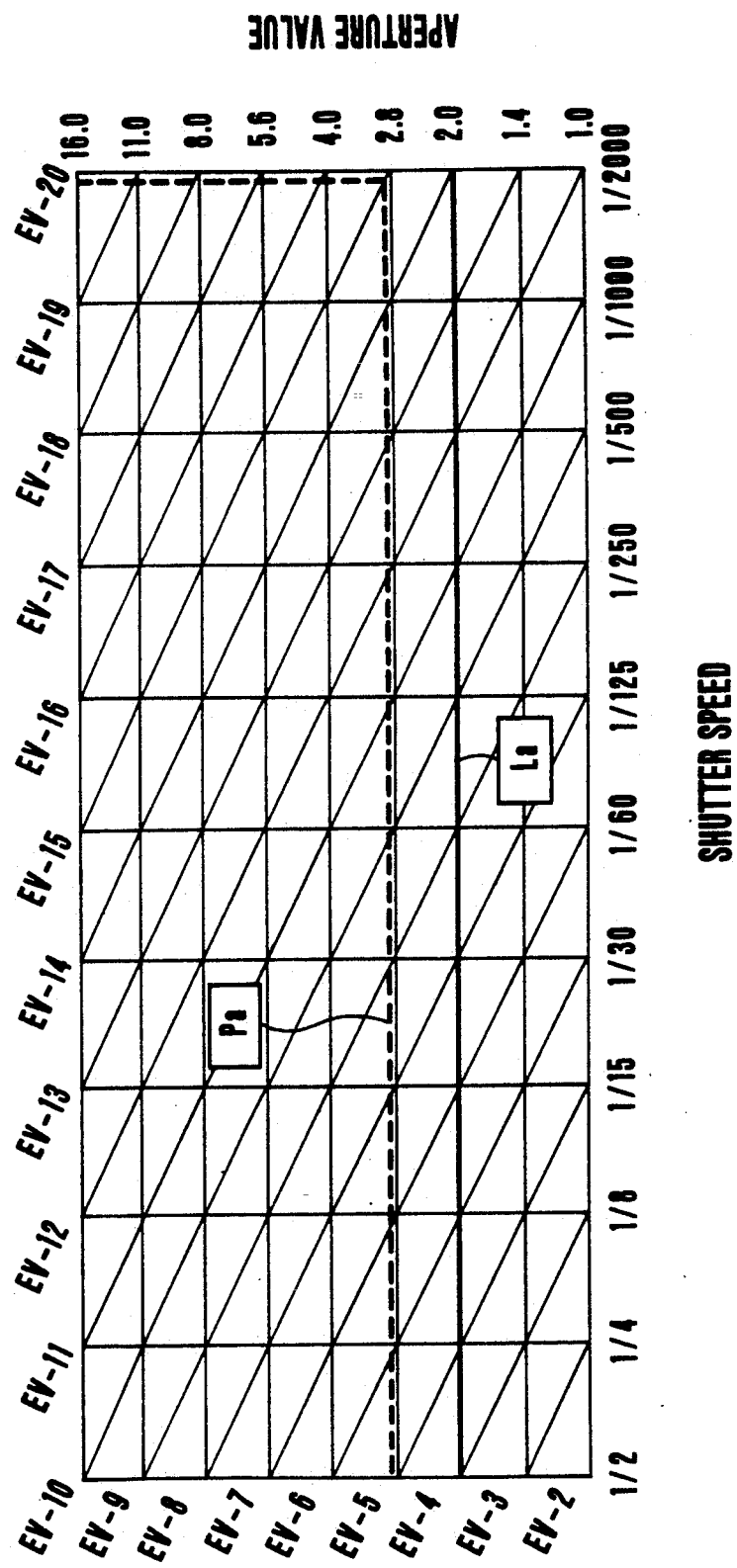
FIGS. 21(a) and 21(b) are charts representing different exposure control patterns of the camera according to a sixth embodiment of the present invention.
Figure 21B:
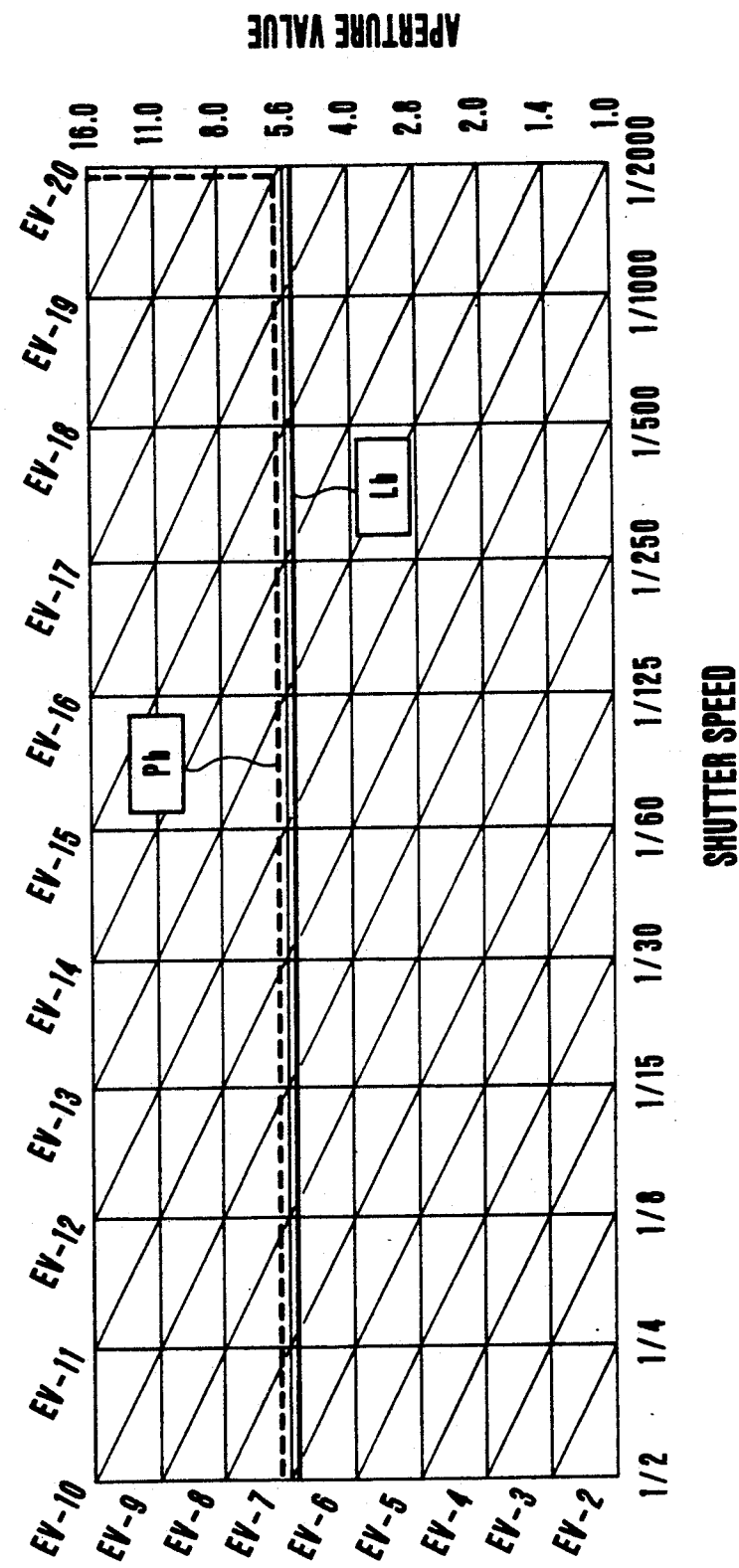

To solve the above-described problems, a camera according to a sixth embodiment is provided with a program chart in which an aperture value is set on an open-aperture-priority basis as shown in FIG. 21(a) or 21(b) in the case of the soft-focus photography.

In addition, in the case of the soft-focus photography, an aperture value is fixed as shown in the program chart of each of FIGS. 21(a) and 21(b).

FIGS. 21(a) and 21(b) are program charts showing different patterns of exposure control of the camera according to the sixth embodiment.

FIG. 21(a) is a program chart showing exposure control which is applied to a lens having an open-aperture F number of 2.0, and a solid line La represents the open-aperture F number, while a dashed line Pa represents a combination of an aperture value and a shutter speed. In the exposure control pattern shown in FIG. 21(a), even if the open-aperture F number is 2.0, exposure control is executed on an F2.8-priority basis, taking account of the intensity of light passing through the edge portion of the photographic lens and the unsharpness properties thereof. If a measured-light value indicative of a sufficiently bright condition is obtained, after the shutter speed has reached 1/2000 second, the diaphragm is stopped down.

FIG. 21(b) is a program chart showing exposure control which is applied to a lens having an open-aperture F number of 5.6, and a solid line Lb represents the open-aperture F number, while a dashed line Pb represents a combination of an aperture value and a shutter speed. In the exposure control pattern shown in FIG. 21(b), since the open-aperture F number is 5.6, it is impossible to execute exposure control on an F2.8-priority basis, F5.6-priority exposure control is adopted.

As described above, the camera according to the sixth embodiment is provided with the program chart in which the aperture value is set on the open-aperture-priority basis as shown in FIG. 21(a) or 21(b) if the soft-focus photography is selected. Accordingly, it is possible to minimize the amount of lens driving required to form a defocused image in the second cycle of exposure, whereby it is possible to reduce a processing time duration and also to enlarge the luminance range in which a subject image with a soft-focus effect can be photographed.

In the camera according to the sixth embodiment, in the case of photography of a pseudo-soft-focus image, the program chart is adopted in which the aperture value is fixed as shown in FIG. 21(a) or 21(b). Accordingly, even if the degree of the soft-focus effect is to be altered on the basis of the exposure ratio of the first cycle of exposure to the second cycle of exposure, it is possible to alter the exposure ratio by altering only a shutter speed. Accordingly, since alteration of an aperture value is not needed, it is possible to shorten a processing time duration.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent arrangements and functions.

What is claimed is:

1. A camera having a special photography function, comprising:
   focus detecting means for detecting a state of focus of a subject;
   focus-position altering means for altering a focus position of a photographic optical system in response to a detection result provided by said focus detecting means; and
   special-photography executing means for executing special photography utilizing multiple exposure, said special-photography executing means being arranged to control said focus-position altering means in response to a release operation to shoot one exposure on a photosensitive portion with said photographic optical system placed in an in-focus position and continuously shoot at least one exposure on the same photosensitive portion with said photographic optical system placed in a defocused position on a closest-distance side, thereby effecting the multiple exposure.

2. A camera having a special photography function, comprising:
   focus detecting means for detecting a state of focus of a subject;
   focus-position altering means for altering a focus position of a photographic optical system in response to a detection result provided by said focus detecting means;
   light measuring means for measuring a luminance of a subject;
   exposure controlling means for executing exposure control based on a measured-light value provided by said light measuring means; and
   special-photography executing means for executing special photography utilizing multiple exposure, said special-photography executing means being arranged to control said focus-position altering means in response to a release operation to shoot one exposure on a photosensitive portion with said photographic optical system placed in an in-focus position and continuously shoot at least one exposure on the same photosensitive portion with said photographic optical system placed in a defocused position, thereby effecting the multiple exposure;
   when said special photography is to be executed, said exposure controlling means executing exposure control on an open-aperture-priority basis.

3. A camera having a special photography function, comprising:
   focus detecting means for detecting a state of focus of a subject;
   focus-position altering means for altering a focus position of a photographic optical system in response to a detection result provided by said focus detecting means;
   flashing means; and
   controlling means for providing control to automatically execute special photography utilizing multiple exposure, said controlling means being arranged to control said focus-position altering means in response to a release operation to shoot one exposure on a photosensitive portion with said photographic optical system placed in an in-focus position and continuously shoot at least one exposure on the same photosensitive portion with said photographic optical system placed in a defocused position, thereby effecting the multiple exposure;
   when said special photography is to be executed, said controlling means causing said flashing means to emit light only when said one exposure in the multiple exposure is shot with said photographic optical system placed in the in-focus position.

4. A camera having a special photography function, comprising:
   focus detecting means for detecting a state of focus of a subject;
   focus-position altering means for altering a focus position of a photographic optical system in response to a detection result provided by said focus detecting means;
   light measuring means for measuring a luminance of a subject;
   exposure controlling means for executing exposure control based on a measured-light value provided by said light measuring means; and
   special-photography executing means for executing special photography utilizing multiple exposure, said special-photography executing means being arranged to control said focus-position altering means in response to a release operation to shoot one exposure on a photosensitive portion with said photographic optical system placed in an in-focus position and continuously shoot at least one exposure on the same photosensitive portion with said photographic optical system placed in a defocused position, thereby effecting the multiple exposure;

when said special photography is to be executed, said exposure controlling means executing the multiple exposure by using a fixed aperture value.

5. A camera having a special photography function, comprising:

focus detecting means for detecting a state of focus of a subject;

focus-position altering means for altering a focus position of a photographic optical system in response to a detection result provided by said focus detecting means; and special-photography executing means for executing special photography utilizing multiple exposure, said special-photography executing means being arranged to control said focus-position altering means in response to a release operation to shoot one exposure on a photosensitive portion with said photographic optical system placed in an in-focus position and, thereafter, continuously shoot at least one exposure on the same photosensitive portion with said photographic optical system placed in a defocused position, thereby effecting the multiple exposure.

6. A camera having a special photography function, comprising:

focus detecting means for detecting a state of focus of a subject;

focus-position altering means for altering a focus position of a photographic optical system in response to a detection result provided by said focus detecting means;

special-photography executing means for executing special photography utilizing multiple exposure, said special-photography executing means being arranged to control said focus-position altering means in response to a release operation to shoot one exposure on a photosensitive portion with said photographic optical system placed in an in-focus position and continuously shoot at least one exposure on the same photosensitive portion with said photographic optical system placed in a defocused position on a closest-distance side, thereby effecting the multiple exposure; and information imprinting means for imprinting information on the photosensitive portion;

while said special photography is being executed, said information imprinting means executing imprinting of the information only during the one exposure which is shot with said photographic optical system placed in the in-focus position.

* * * * *